Figure 1:
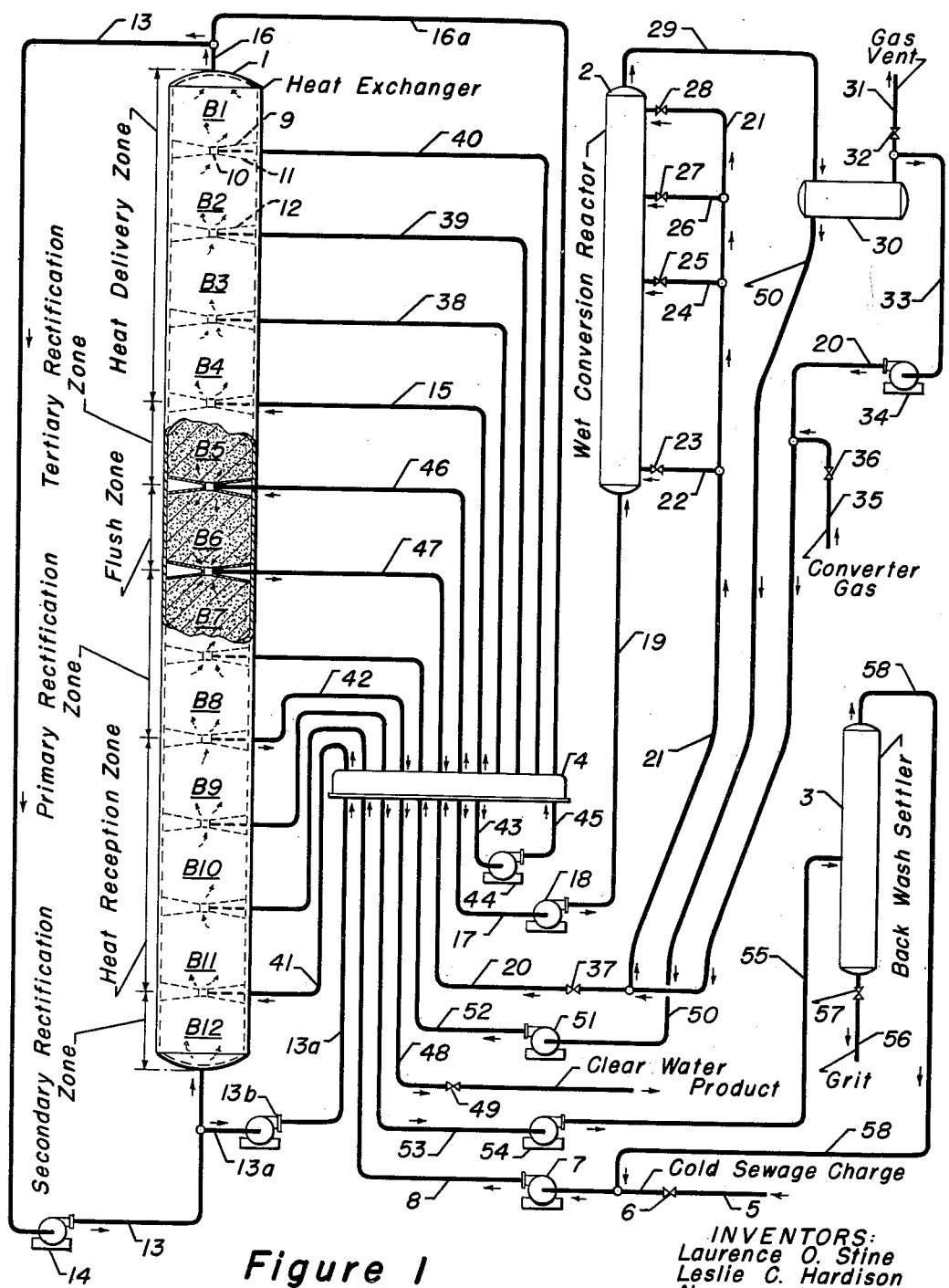

3,133,016
CONTINUOUS TREATMENT OF POLLUTED WATER

Laurence O. Stine, Western Springs, Leslie C. Hardison, Arlington Heights, and Norman H. Scott, Villa Park, Ill., assignors to Universal Oil Products Company, Des Plaines, Ill., a corporation of Delaware
Filed Oct. 8, 1962, Ser. No. 229,126
23 Claims. (Cl. 210—3)

This invention relates to a process for converting water contaminated with organic materials, such as sewage, to a potable aqueous product. More specifically, this invention concerns a process for continuously converting organic-contaminated aqueous streams to fresh, potable water by means of a process wherein the incoming contaminated stream is heated by heat exchange with one or more beds of solid particles containing heat stored in the solid particles during a prior cycle of operation and wherein any loss of heat from the process is replaced by the heat developed upon conversion of the organic contaminants of the polluted water, for example via oxidation or reduction of the organic material.

One object of this invention is to substantially eliminate the organic contaminants of an aqueous stream and in a special application of the process, to produce a stream of potable water as the primary product of the process. Another object of the invention is to provide a process for the foregoing conversion wherein all of the heat required in the process is derived internally in the system. Still another object of the invention is to effect the conversion of sewage to a potable water product on a continuous basis and without the consumption of externally-supplied heat.

In one of its embodiments this invention relates to a continuous process for converting an aqueous feed stock containing organic material to a product consisting essentially of water substantially free of organic material which comprises contacting a relatively cool stream of said aqueous feed stock with a mass of solid particles having heat exchange capacity in the heat delivery zone of a multi-zoned fixed bed of said solid particles, the downstream portion of said zone containing solid particles and interstitial fluid surrounding the solid particles at a relatively higher temperature than said aqueous feed stock, whereby heat is transferred from the solid particles to said feed stock as the aqueous stream flows toward the downstream outlet of the heat delivery zone and the temperature of the aqueous stream adjusts substantially to the elevated temperature of the solid particles, continuously transferring at least a portion of the effluent stream from the downstream outlet of the heat delivery zone into the inlet of the next downstream secondary rectification zone, contacting the resulting feed stock with a converter gas comprising one of the group consisting of oxygen and hydrogen at a pressure sufficient to convert the organic material in said feed stock to a volatile conversion product at said elevated temperature, simultaneously forming an intermediate aqueous stream substantially free of organic matter and of higher temperature than the stream entering the conversion reaction, continuously introducing the downstream effluent of said secondary rectification zone into the next adjacent downstream heat reception zone wherein heat in the fluid phase is transferred to relatively cool particles of heat exchange solid resident in the downstream portion of said heat reception zone, continuously removing from the downstream outlet of the heat reception zone relatively cool, heat-exchanged aqueous product, simultaneously and continuously charging a primary reflux portion of the cool effluent of the heat reception zone into the next adjacent downstream primary rectification zone, transferring interstitial fluid displaced from the void spaces between the particles of solid heat exchange material in a more remote, downstream portion of the mass of heat exchange particles into the inlet of the farthermost downstream portion of said heat exchange particles, and continuously combining said displaced interstitial fluid with aqueous feed stock entering the next adjacent downstream heat delivery zone, said process being further characterized in that each portion of the mass of heat exchange particles of said zones is serially interconnected in fluid flow relationship to the next adjacent portion and all of the fluid inlets and outlets into and from the stationary mass of heat exchange particles are shifted equidistantly to positions in the mass of heat exchange particles which bear the same spaced relationship to each other after the shift as the positions did before the shift, at a rate whereby the fluid stream at any given point in the continuous, cyclic flow has substantially attained temperature equilibrium with the solid particles of heat exchange material.

In both its broad and more specific applications this invention involves other embodiments which will be referred to in greater detail in the following further description of the process of this invention.

Sources of fresh, noncontaminated water have long been recognized as one of the important resources of any country relying upon natural water supplies for human consumption and to maintain a communal and industrial society. As the population of urban centers increases, the demand for fresh water is rapidly approaching the limits of supply and within the succeeding decades the per capita consumption of fresh water in many areas will of necessity be drastically curtailed to meet only the most urgent needs of the community. A means of separating and thereafter recycling the aqueous portion of sewage while converting the waste contaminants in the sewage to an inoffensive, bacteria-free by-product provides an ideal alternative to not only the problem of disposing sewage waste, but also the problem of providing adequate fresh water sources of supply. Such an idealized system would furthermore reserve the existing water sources for wild life and recreational purposes and would also eliminate the present elaborate processes of sewage treatment by the time-honored sewage digestion method.

The process of this invention for the continuous treatment of organic-contaminated aqueous streams provides a means of attaining the objectives of the aforementioned idealized fresh water recycling system and is capable of treating a wide variety of organic-contaminated aqueous streams including such sources as: domestic sewage effluents; waste water effluents of the chemical and petroleum process industries, such as petroleum refinery waste streams contaminated by such organics as hydrocarbons, phenols, mercaptans, etc.; paper industry sulphite waste liquors which are generally contaminated by high concentrations of lignins, cellulose, etc.; general manufacturing wastes contaminated by a wide diversity of organic chemicals such as chlorinated hydrocarbons, dyes, detergents etc.; the effluents of many sewage digestion plants which often enter natural waterways still highly contaminated with incompletely digested organic materials having high biological oxygen demand, and particularly the effluents of most modern sewage treatment plants handling domestic sewage which contain biologically hard detergents of the alkylaryl sulfonate type, resistant to bacterial digestion; and many other sources of sewage containing organic materials in various concentrations. The foregoing sources of organic contaminated aqueous streams are collectively referred to herein as "sewage" and all of the alternative sources enumerated hereinabove are contemplated within the scope of this invention as suitable feed stocks for treatment herein.

One of the primary advantages of the present method of sewage treatment which enables the process to compete economically (in fact, to supplant) processes currently used for large scale sewage digestion is the ability of the present method to convert any of the foregoing sewage effluents into potable, fresh water, essentially without consumption of externally supplied heat, the only significant utility consumed in the process being the electrical energy required for the operation of pumps, valves, compressors etc. In addition, the process of this invention may be operated on a continuous-flow basis at flow rates equal to or greater than many large sewage digestion plants. Essentially, the present method of sewage treatment involves the wet oxidation or reduction of the organic contaminants in the sewage at a temperature within the range of from about 200° to about 600° F. (accompanied by superatmospheric pressures, when operated at the higher temperatures in the above range), utilizing a process flow in which a continuously-charged influent stream of sewage is heated to the required wet conversion temperature by heat exchange with one or more fixed beds of solid particles having heat exchange capacity and preheated to the conversion temperature as heat stored in the particles from a prior cycle of conversion. After conversion via oxidation or hydrogenation at the elevated temperature, the heat carried by the hot, purified water is transferred via heat exchange in a downstream, relatively cool portion of the mass of solid particles, both the hot and the cold zones being contained within the same process cycle, in the same continuous bed of particles or in the same series of beds. At any given stage of the cycle the feed inlet stream is heated by contacting the cool feed stream with hot heat exchange particles which were preheated by heat exchange with the hot effluent converted sewage stream which is simultaneously contacted with the solid particles in a further upstream portion of the cycle. Heat losses from the system such as radiation and sensible heat removed in the effluent products are generally more than fully replaced by the heat liberated as a result of the conversion of the organic contaminants present in the sewage feed stock, depending upon the quantity of such organic contaminants suspended in the aqueous sewage. However, in most instances utilizing raw sewage as the primary feed stock, the fresh water product is withdrawn from the process at a high temperature than the incoming sewage and the process is self-sustaining, insofar as heat requirements are concerned.

Whether the organic components of the sewage are converted via oxidation or reduction, the conversion is preferably effected at sufficiently severe reaction conditions and/or in the presence of a sufficiently active catalyst to form normally gaseous conversion products which in the case of sewage conversion in the presence of hydrogen (reductive conversion) include such ultimate gaseous products as methane (particularly under hydrocracking conditions, although in some cases, higher paraffinic hydrocarbons may also be formed), ammonia and hydrogen sulfide; in the presence of oxygen (oxidative conversion) the normally gaseous conversion products include such gases as carbon dioxide, nitrogen, sulfur dioxide, etc.

The rapid oxidation of organic matter in the presence of a limited quantity of water has heretofore been provided in various processes, usually operated at relatively high temperatures (above 400° F.) and at high pressures (above 500 lbs./in.$^2$). These processes, exemplified by the Zimmerman wet oxidation method for the treatment of sewage wastes, generally rely upon high operating pressures in order to supply sufficient oxygen into the closed reactor to satisfy the large demand for oxygen on a sustained reaction basis. The presently known methods also generally require that the feed stock submitted for oxidation be available in a form of relatively high organic solids content in which the particles are finely subdivided, whereby the oxidation becomes self-sustaining and not dampened by the presence of any substantial proportion of inert materials, such as water which must also be heated to a temperature above the conversion threshold. Thus, although these processes are generally self-sustaining, they require pretreatment of the feed stock to separate therefrom the reactive components and they require the provision for special process conditions to maintain the process on a self-sustaining basis and are self-sustaining only as long as the reactor charge contains a sufficiently high proportion of organic material in a sufficiently fine state of subdivision to react at a self-sustaining rate. The process of the present invention, on the other hand, besides being self-sustaining, operates in the dilute phase (i.e., in the presence of large proportions of water) and also operates on a continuous-flow basis utilizing cold feed stocks and at any convenient rate of flow.

One of the outstanding advantages of the process provided by this invention, however, is the ability of the method to convert the dilute aqueous sewage to a clear potable water product at only nominal cost, which decreases as the feed rate increases.

The process of this invention is more fully described by reference to the accompanying diagrams, FIG. 1 of which illustrates a sewage treatment process operated in accordance with the present invention for the recovery of a fresh water product from a raw sewage feed stock. This process embodies a stage involving the wet conversion of the organic contaminants, either within the heat exchanger portion of the equipment (shown in FIGURE 1 as column 1), or, separately, in an auxiliary wet oxidation reactor 2, removal of ash from the oxidation reactor and removal of the precipitated solids from the heat exchange beds in a backwash settler 3. The process is operated continuously and as a necessary part of the equipment for maintaining the heat exchange stages on a continuous basis, rotary valve 4 of special design is provided to shift the inlets and outlets of column 1 and thereby maintain the solid particles of heat exchange medium in simulated moving bed relationship to the fluid stream. As heretofore indicated, the process of this invention may also be adapted to operate in conjunction with already installed aerobic or anaerobic sewage digestion processes whereby the capacity of the digestion process is substantially increased at a higher temperature which increases the rate of digestion. The latter adaptation of the sewage treatment process is illustrated in FIGURE 2 of the accompanying diagrams.

The operation of the present process for converting aqueous sewage streams of large volumes to potable water at little or no cost for supplying the heat required to operate the process is dependent upon an efficient heat exchange operation whereby a continuous stream of incoming aqueous sewage is heated to the required conversion temperature by extracting heat stored in a fixed bed of solid particles and following the conversion of the organic components of the sewage in which the aqueous phase is heated to a higher temperature by virtue of the heat liberated by the conversion reaction, the particles cooled in a preceding stage of the cycle are contacted with the converted sewage to extract the heat from the aqueous product stream. Thus, the heat present in the system is alternately passed from solid to fluid as the high and low temperature zones are shifted in a continuously cyclic pattern. The operation of the process involves maintaining the solid particles of heat exchange medium in a single, continuous fixed bed having multiple inlet and outlet ports for charging and withdrawing fluid streams, or in a number of serially interconnected fixed beds, the outlet of the last bed of any series of beds being connected with the inlet of the first bed in the series. By continuously or periodically relocating the fluid inlet and outlet points (i.e., by shifting the fluid inlets and outlets into and from the bed of solid particles in the same successive order and in the same direction as the flow of the continuous fluid phase) a simulated, countercurrent movement of the stationary solid particles relative to the flowing fluid phase is obtained. Since the solid particles act as the medium for heat transfer between the two fluids (one of which is the cold, raw sewage and the other is the hot, aqueous product), the relative flow rates of the fluids (represented by their masses) is determined by the following energy balance:

$$\underset{\text{Solid}}{\text{Mass} \times \text{Cp} \times \Delta \text{T}} \cong \underset{\text{Cold Liquid}}{\text{Mass} \times \text{Cp} \times \Delta \text{T}} \cong \underset{\text{Hot Liquid}}{\text{Mass} \times \text{Cp} \times \Delta \text{T}}$$

In the present process, heat exchange between liquid and solid is very efficient (i.e., the process provides a large solid surface per volume of liquid) and approach temperature differentials are substantially equal; therefore, when the maximum temperature rise for the cold stream is desired:

Mass×Cp (Solid)≅Mass×Cp
    (Cold Liquid)≅Mass×Cp (Hot Liquid)

the rate of sewage treatment is determined by the mass of solid particles in the process and the specific heat of the solid. The present process and its method of operation will be further explained in the accompanying diagrams.

Figure 2:
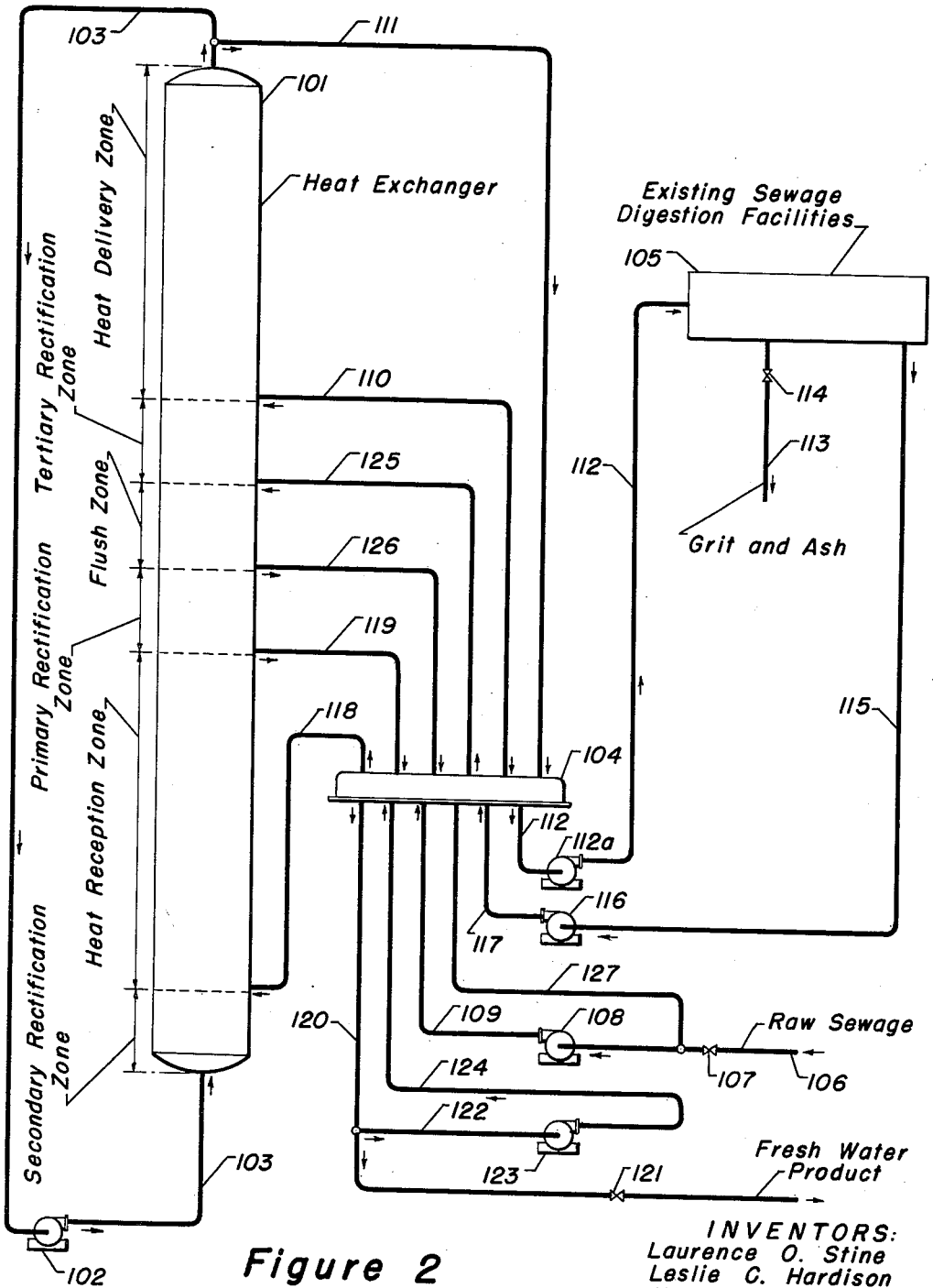

Referring to FIGURE 1, raw sewage at ambient or atmospheric temperature and containing a significant proportion of organic contaminants, either as free solids or liquids, or as organic contaminants in solution, is charged into the process flow through line 1 at the particular operating pressure existing within the process equipment, as hereinafter more fully specified. Although not necessarily essential to the operation of the process, large pieces of free solids present in the sewage are either screened from the raw sewage feed stock, or more preferably, are subjected to a preliminary grinding operation, for example, by passing the sewage through a hammer mill to reduce the larger pieces of solids in the sewage to fines. Since the rate of reaction in the subsequent wet oxidation or reduction stage of the process is inversely proportional to the size of the solid particles of organic material suspended in the sewage, any pieces of solid too large to remain suspended are preferably sufficiently reduced in size to provide a fine suspension of particles in the aqueous sewage by grinding, tumbling or by other known means of comminution, although the solids may also be separated by settling and decantation of the aqueous upper phase from the solids on the bottom of the settler. The stream of sewage enters the process flow at a rate controlled by valve 6 in line 5 and is thereafter transferred by means of pump 7 at the pressure existing within the process into line 8 which directs the incoming stream of sewage into a suitable fluid distribution center, depicted in schematic form in FIGURE 1 as a multiport rotary valve 4, which provides a means of distributing the various influent and effluent streams on a continuous-flow basis into and from the several functional zones of fluid-solid contacting column 1 through channels and ports designed and machined into the valve. The valve and its manner of operation will be referred to more fully in the subsequent description of the apparatus.

The heat exchange stage of the present process cycle is effected in an apparatus which provides a fixed bed (or a number of serially arranged, adjacent fixed beds) packed with a particulate solid heat exchange material into which one or more influent fluid streams are charged, and from which one or more fluid streams are withdrawn while maintaining the stationary mass of heat exchange particles in countercurrent, simulated moving bed flow relationship to the stream of fluid flowing through the particles of solid. Whether made up of a single, continuous fixed bed of solid particles having heat exchange capacity, or whether the unit comprises a number of serially interconnected fixed beds, the process flow nevertheless comprises at least three functional zones, the boundaries of which are determined by the points of inlet and outlet for at least one stream flowing into one of the zones and two streams flowing out of two of the zones. When the apparatus utilized herein for treatment of the inlet sewage is a single, continuous bed of solid particles, the functional zones begin and end at the inlet and outlet points of the influent and effluent streams going into and out of the fixed bed of particles. In general, however, a serially interconnected multiple-bed apparatus is preferred because of the possibility of greater control over the process which may be provided in this arrangement. The preferred multiple bed arrangement is illustrated in FIGURE 1 of the accompanying diagrams, which will hereinafter be further described in greater detail. It is to be emphasized, however, that under some conditions of operation, a single, continuous fixed bed of solid particles, as illustrated in FIGURE 2 hereof, may be preferred over the multiple bed arrangement illustrated in FIGURE 1.

Each adjacent bed of the multiple bed unit is interconnected by conduits and the outlet of the last bed of the series is connected by a conduit to the first bed in the series, thereby providing a continuously cyclic, fluid flow pattern. Provision is made for charging and withdrawing fluid streams into and from each bed, for example, by means of inlet or outlet pipes (depending upon the function of the zone of which the particular bed is a part) connected as a side-arm to the conduit interconnecting adjacent beds. The latter side-arm conduit is joined by a pipe which connects the side-arm to a fluid distribution center where the several inlet and outlet streams are directed to the appropriate beds in each of the functional zones of the process flow. The fluid distribution center is also designed to simultaneously shift the inlet and outlet points of fluid entry and withdrawal into and from each of the functional zones to more downstream points as the process continues to operate (that is, in the direction of fluid flow through the serially arranged fixed beds), thereby effecting what is referred to herein as a simulated movement of the solid particles of the heat exchange material countercurrent to the continuous flow of the fluid stream through the zones.

FIGURE 1 of the accompanying diagrams illustrates a particularly preferred design and arrangement of apparatus for carrying out the present process, being especially preferred because the arrangement of the fixed beds serially adjacent to each other provides a compact, efficient and highly effective unit for accomplishing the objectives of the process. The series of beds (preferably at least four in number) are vertically stacked, one upon the other, through which the continuous fluid stream flows in either upflow or downflow direction. In the process flow illustrated in FIGURE 1, the stream of fluid is directed to flow upwardly, except in the "flush" zone in which a backwash stream flows downwardly through one or more beds. Each adjacent bed is connected to its next subadjacent and superadjacent bed by means of short, interconnecting conduits. Alternatively, the beds may be arranged horizontally, with interconnecting conduits essentially in the same plane. The vertically stacked arrangement is illustrated in FIGURE 1 as column 1, comprising an external shell and containing a number of suitably shaped horizontal partition members, preferably funnel-shaped, to direct the path of fluid flow into the interconnecting conduits between plates. The partition members divide the vertical column into a series of adjacent contacting beds, B1 to B12. In bed B1, the partitioning member is designated as 9, having downcomer conduit 10 connecting with subadjacent bed B2 bounded on the top by inverted funnel-shaped partitioning member 11 and on the bottom by partitioning member 12.

Each of the resulting serially-arranged twelve beds contains a mass of solid particles having heat exchange capacity through which influent sewage flows at regularly spaced intervals during each cycle of operation in a downstream direction. The particles are preferably of substantially uniform size in order to eliminate channeling of fluid through passage of least resistance and more preferably, are particles of substantially spherical or ellipsoidal shape to reduce flow resistance to a minimum and concomitantly provide particles of large surface area per volume, a factor essential to the rapid transfer of heat between the fluid and solid phases. Other shapes which provide large surface area per volume, such as rings, cylinders, and saddles may be preferred in particular instances. The particles of solid are also preferably composed of a heat conductive material having sufficient specific heat to provide a reservoir for the storage of heating or cooling capacity. Depending upon the size of the heat exchange unit and the rate of fluid flow through the column, the particles may vary in size from about 80 mesh to about 1 to 2 mesh, more preferably from about 5 to about 20 mesh. Although the rate of heat exchange for the particles is inversely proportional to their size, the rate of heat exchange can be increased for large particles (utilized, for example, to reduce pressure drop to a minimum) by increasing the cross-sectional area of the bed(s) to provide a greater mass of solid heat exchange particles per volume of influent sewage fluid and/or per unit of time. Thus, particles of solid varying in size from grains of sand to gravel may be utilized as heat exchange medium. From the standpoint of heat conductivity, metallic shot constitutes one of the preferred materials for use as the heat exchange particles.

An essential unit of the present combination apparatus, essential, that is, to the realization of the type of flow provided by the present process is a suitable programing device for advancing each of the points of fluid inlet and outlet equidistantly in a downstream direction through the series of beds and for changing the flow direction of the fluid stream to upflow in the flush zone during the operation of the process. A suitable form of fluid distribution center may comprise, for example, a manifold arrangement of pipes carrying inlet and outlet streams intersecting the conduits which convey the influent and effluent streams to and from each of the beds, the intersecting network of manifolds and conduits containing valves which control the flow of fluids into the appropriate lines carrying the influent and effluent streams to the appropriate beds of solid particles in the heat exchange column. A generally more preferred programming device and fluid distribution center is illustrated and described in common assignee's U.S. Patent Number 3,040,777, issued June 26, 1962 for Don B. Carson et al. The so-called "rotary valve" shown in this patent is illustrated schematically and diagrammatically in the accompanying FIGURE 1 as multiport rotary valve 4 containing a number of inlet and outlet ports on the inside face of one of the flat plates which comprises the valve, the ports aligning themselves with channels on the inside face of the other plate which carry the influent and effluent streams. Each of the 12 ports in the stationary plate are connected by lines to the downcomers, interconnecting adjacent beds. Further provision is made in the design of valve 4 to continuously or intermittently rotate the plate connected to the manifold lines in one direction of rotation (i.e., clockwise or counterclockwise, depending upon whether the fluid stream flowing through column 1 is upflow or downflow). By thus changing the position of the inlet and outlet ports on one side of the valve with respect to the openings in the inlet and outlet channels on the other side of the valve the inlet and outlet points to the beds in column 1 are shifted in accordance with a regular, cyclic program in a downstream direction, prearranged for column 1 by the design of valve 4. Since the channels carrying influent and effluent streams are fixed by the position of the channels in valve 4, the points of inlet and outlet for the influent and effluent streams are successively shifted in equidistant aliquots of the entire cycle until the points of inlet and outlet of the respective streams arrive at their points of beginning, whereby one complete cycle of operation is consummated.

The flow of fluid through column 1 is maintained in a generally downstream direction by connecting the outlet at the top of the last bed in the series (here shown as bed B1) to the inlet at the bottom of the first bed in the series (illustrated as bed B12) through line 13 containing pump 14 which increases the pressure of the fluid on the discharge side of the pump to a level exceeding the pressure on the intake side of the pump. The manner of shifting the respective points of inlet and outlet for the various streams involved in the present process and the effects obtained thereby will be further explained in connection with the description of the apparatus and process flow shown in FIGURES 1 and 2 hereof.

The present sewage treatment process includes the provision for a relatively hot zone of heat exchange material and a relatively cool zone simultaneously in two separate, spaced portions of the heat exchange mass in column 1. As the inlet and outlet points for the influent and effluent fluids advance in a downstream direction through column 1, the relative positions of the hot and cold zones remain fixed with respect to each other (i.e., the points of temperature extremes in the mass of particles are maintained at a fixed distance from each other), but both zones advance cyclicly through the column in regular intervals, advancing at the same rate at which the inlet and outlet points advance through the series of fixed beds. Thus, at any given point of time the zone of relatively high temperature occupies one or more specific beds in column 1, but eventually thereafter, during one continuous cycle of operation, the zone of relatively low temperature moves into the space formerly occupied by the high temperature zone at the same time that the latter has advanced to a further downstream series of beds which were the beds formerly comprising the low temperature zone. As the cool influent feed stock enters the high temperature zone, the fluid extracts substantially all of the heat stored in the solid particles in the series of beds via an efficient system of heat exchange; before the purified aqueous stream derived from a given quantity of feed stock is removed from the process it again, at a certain portion of the cycle time later, gives up its heat to the solid particles in another section of the heat exchange column, the aqueous phase leaving at substantially the same temperature as the inlet feed stock; since substantially all of the heat extracted by the liquid phase from the solid is returned to the solid, the present process operates substantially without net consumption of heat.

FIGURE 1 of the accompanying diagrams illustrates the various functional zones existing in a full-scale cycle of the present process at a particular moment of time in which the raw sewage influent stream flows into column 1 through line 15, entering the downcomer between beds B4 and B5 (which constitutes the inlet to bed B4, since the continuously flowing fluid is flowing upwardly through the column). Bed B4 thereby becomes the inlet of the primary contacting zone (herein also referred to as the Heat Delivery Zone) wherein contact between the cold sewage influent stream and the hot, solid heat exchange medium occurs. Each of the high and low temperature zones are designated with respect to the flow of heat into or from the solid particles of heat exchange medium. That is, in the Heat Delivery Zone the flow of heat is from the particles of solid to the fluid phase, whereas in the Heat Reception Zone the heat present in the fluid phase is transferred to the cold solid particles where it is stored for subsequent retransfer to cold influent fluid.

The stream of cold sewage entering column 1 from fluid distribution center 4 contacts a mass of solid heat exchange particles having a higher average temperature than the cold influent sewage. Accordingly this section of the column is referred to as a Heat Delivery Zone. The function of this zone is to transfer the heat present in the solid particles comprising this zone to the cold influent sewage, raising the temperature of the sewage to a level at which the sewage undergoes conversion upon contact with oxygen or hydrogen, either in the downstream portion of the Heat Delivery Zone after the stream has acquired an elevated temperature via heat exchange with the solid particles in the upstream portion of the zone or in an external conversion reactor, such as oxidation reactor 2 of FIGURE 1. The influent sewage stream flowing in a downstream direction from bed B4 into bed B3 and thereafter successively into beds B2 and B1 gradually increases in temperature to the maximum temperature maintained in the downstream portion of the Heat Delivery Zone, the stream simultaneously cooling the particles of heat exchange solid as the sewage flows downstream in heat exchange relationship to the mass of solid particles toward bed B1. Thus, the particles of solid in bed B4 are cooled to substantially the sewage inlet temperature during the period of time that bed B1 is on stream as the first bed of the Heat Delivery Zone; simultaneously, a downstream portion of the sewage stream has attained a higher temperature which increases toward the downstream outlet of the Heat Delivery Zone and is maximum at the outlet of the latter zone. By virtue of such simulated countercurrent flow of solid particles relative to the continuously flowing fluid stream and the large heat exchange surface provided by the mass of particulate heat exchange material, substantially all of the sensible heat in either the solid or liquid phase is transferred to the other phase during the process cycle and accounts for the economy of net heat utilization in the present process.

FIGURE 1 of the accompanying diagrams illustrates the alternative process flow encompassed within the scope of the present invention in which the Heat Delivery Zone functions exclusively for heat exchange purposes whereby the cold sewage influent stream is heated to the conversion temperature via heat exchange with the solid particles in this zone and the resulting effluent of the zone is removed from column 1 at the elevated temperature and converted in external reactor 2.

The stream flowing from the top of bed B1, having attained the elevated temperature of the solid particles in the upstream portion of the Heat Delivery Zone, flows into line 16 and divides into two portions: (1) a major portion of the fluid stream which is withdrawn from line 16 through line 16a, through fluid distribution center 4 which directs the stream into external conversion reactor 2, and (2) a pump-around stream which is conveyed into line 13 and transferred at a rate of flow specified as the secondary reflux flow rate (for the process in which the conversion reaction is effected in a reactor external to heat exchange column 1) or at a rate corresponding to the entire effluent stream of the Heat Delivery Zone when the conversion reaction is effected in the downstream end of the Heat Delivery Zone. In either alternative flow, recycle pump-around fluid enters the inlet of bed B12, the first bed of the secondary rectification zone. The pump-around stream makes the process continuously cyclic at all stages of the cycle by virtue of the increase in pressure imparted to the stream in line 13 by means of pump 14 which ensures downstream flow against the pressure drop developed in the downstream beds, except when the bed upstream from the raw sewage feed inlet is flushed as hereinafter described. The rate of pump-around flow varies throughout each cycle, depending upon the particular stage of the process being maintained in bed B1 of the contacting column. Since the flow rate and pressure of the pump-around stream varies throughout the cycle, depending upon the particular stage of the cycle involved, the pump-around stream is maintained under independent pressure control. Thus, when the sewage influent stream enters the process flow through line 16a, the pump-around stream is made up entirely of sewage influent which enters bed B12 at the influent sewage charge rate and at the pressure provided in this zone of the process. The independent pressure control in each of the beds is also illustrated when bed B12 is being flushed with clear water product, as hereinafter more fully described. The streams charged into and removed from column 1, however, flow continuously in certain, predetermined quantities and flow rates which are conveniently fixed by flow control meters and valves in the lines connecting fluid distribution center 4 to the bed(s) of column 1.

At the particular stage of the process cycle illustrated in FIGURE 1 in which the pump-around stream is that portion of the effluent from the Heat Delivery Zone consisting of secondary reflux which flows into the present secondary rectification zone, the flow rate of this stream into bed B12 is directly controlled by a separate flow control meter on pump 14, the balance of the effluent from bed B1 being withdrawn through line 16a as heated sewage intermediate product which is transferred to the external sewage conversion unit 2. The preferred secondary reflux flow rate (for the embodiment of this invention in which the raw sewage conversion is effected in an external reactor unit) is controlled to provide a volume of fluid somewhat less than the aggregate volume of void space in the first bed downstream from the inlet of the secondary rectification zone during the period of time that this bed is on stream as the secondary rectification zone, and, more preferably, from 80 to 100% of said void space volume. A more convenient basis of establishing reflux flow rates is expressed as the ratio of the volume of actual reflux to the aggregate void volume occupied by the interstitial fluid phase between particles of solid per prorated portion of the total cycle period attributed to each shift of inlets and outlets. This rate ratio, referred to herein as "percent of balanced reflux" measures the rate of interstitial fluid displacement during the course of continuous operation of the process. A reflux flow rate of 100 percent balanced reflux, therefore, indicates that the points of inlet and outlet for the streams flowing into and from the mass of solid particles are shifted in a downstream direction at a rate such that the volume of void space in the solid phase, in effect moving upstream, is just equal to the volume of fluid reflux (not more and not less) flowing downstream in the process flow. The rate of secondary reflux flow is preferably maintained at less than 100% of balanced reflux so that the raw sewage effluent of bed B1, entering the secondary rectification zone as secondary reflux does not advance into the inlet of bed B11 where the raw sewage would then contaminate the water product eventually removed from the heat reception zone. The latter undesirable result would occur if the secondary reflux flow rate exceeded 100 percent of balanced reflux. For the process embodiment in which the conversion of the sewage is effected internally within the heat exchange column (i.e., in the downstream portion of the Heat Delivery Zone), secondary reflux and the secondary rectification zone as such do not exist, except that the entire effluent of the Heat Delivery Zone enters comprising conversion product from a further upstream portion of the process flow.

The present process is started by pre-establishing the hot zones of the process flow before the entry of cold influent sewage into bed B4, for example. Thus, for the stage of the cycle represented by FIGURE 1 hereof, beds B3 to B1, inclusive are preheated by a momentary charge of externally heated water, for example, and the fluid effluent of bed B1 is heated externally to an additional, higher increment of temperature prior to discharge of the stream into bed B11. After thus initially heating the solid particles of heat exchange medium packed into the appropriate beds comprising the hot zones of the process flow, raw influent sewage at its ambient temperature may then be introduced into the process and thereafter allowed to flow continuously under its steady-state operation.

In the particular process embodiment of this invention shown in the accompanying diagram in which the conversion of the sewage via oxidation or reduction in a conversion reactor external to heat exchange unit 1, the portion of the effluent fluid from bed B1 removed from the process flow as heat-exchanged raw sewage through line 16 continues to flow through effluent line 16a into the fluid distribution center, herein shown as rotary valve 4. By means of the aforementioned arrangement of ports and channels in the rotating plate relative to the stationary plate of valve 4, the stream of heated sewage removed from column 1 through line 16a flows through valve 4 into line 17 and is thereafter transferred by means of pump 18 through line 19 into sewage conversion reactor 2 wherein the organic components of the influent sewage undergo conversion via oxidation or reduction in the presence of water at the reaction conditions maintained within reactor 2.

Reactor 2 is maintained at a temperature suitable for the particular conversion to be effected in the process, a higher temperature generally being required for reduction than for oxidation of the organic components of the sewage. The required temperature is also dependent upon a number of other variables, including the state of subdivision of the organic matter in the sewage stream, the ambient pressure of the hydrogen- or oxygen-containing gas, the oxygen or hydrogen content of the converter gas supplied to reactor 2, and to a large extent, whether an oxidation or reduction catalyst is maintained within the reactor to assist in the transfer of oxygen or hydrogen, depending upon the particular conversion being effected in reactor 2, from the converter gas (either in solution or in a separate gas phase) to the particles of organic matter comprising the sewage.

The catalyst, if utilized in conversion reactor 2 to promote the rate of reaction, whether oxidation or reduction, is preferably supplied in the form of discrete particles which provide a large surface area per volume of solid and through which the gaseous and liquid phases may flow without undue resistance from the solid phase. Certain substances of both organic and inorganic character are known catalysts for these reactions. Thus, both copper oxide and silver oxide promote oxidation of organic substances and both are active in the presence of water. Another class of oxidation catalysts utilizable in the present process are the phthalocyanines of a wide variety of metals, particularly the phthalocyanine derivatives of the iron group metals of group VIII of the periodic table, preferably the cobalt and nickel salts and the platinum and palladium sulfides; and phthalocyanine salt derivatives. Certain other substances, particularly metals, and especially the metals comprising the elements of group VIII are catalytically active in promoting hydrogention (i.e., reduction) reactions of organic compounds in the presence of hydrogen. Thus, the metals of group VIII selected particularly from the iron group and platinum group metals, such as iron, nickel, cobalt, platinum and palladium are especially useful reduction catalysts. These catalysts are relatively costly materials and since only the surfaces of the catalyst particles contain catalytically active centers, the preferred catalytic materials are the composites of the active catalytic agent with an inert, inorganic support, preferably having a porous structure which increases the catalytically active centers available to the organic material present in the sewage stream and the converter gas. As in the case of the solid packing material in heat exchange column 1, the size of the catalyst particles in the conversion reactor is also selected to provide the least resistance to the flow of fluid reactants through the column and to provide uniform spacing between the solid particles, to thereby prevent channeling of fluids flowing through the mass of particles. Suitable inert supports which are of the preferred porous structure include materials such as charcoal, particles of silica gel and alumina, particularly in the form of spheres, firebrick, etc., in sizes within the range of from about 1 to about 30 mesh, and more preferably, from about 2 to about 15 mesh. The active catalyst component is preferably deposited on the surface of the inert support, for example, by deposition of the metal in the form of a salt on the outer surface of the inert support particle, followed by oxidation of the resulting composite to convert the metallic salt to the oxide thereof or to the metal itself by reduction in the presence of hydrogen. The phthalocyanine salts may be deposited on the surface of the inert support by impregnating precalcined particles of the support with a solution of the salt and evaporating the solvent from the particles whereby the phthalocyanine salt is deposited as residue on the surface of the inert support. In the case of the platinum group hydrogenation catalysts (i.e., when reactor 2 is operated as a wet reduction reactor) which are especially active in the reduction of the organic components of sewage, generally small amounts of the metal, sulfide or oxide are present in the composite (quantities in the range of from 0.01 to 1.0 percent by weight of the composite are highly active catalysts) and the metal component of the catalyst composition is preferably concentrated near the surface of the catalyst particles.

The converter gas supplied to reactor 2 may be supplied as pure oxygen or pure hydrogen, although in the interest of economy of operation, more dilute mixtures are more readily available. Thus, oxygen is supplied to reactor 2 from an external source as pure oxygen or in admixture with other gases, such as air, and hydrogen is generally supplied as a hydrogen-enriched recycle gas stream, the recycle gas being derived internally. The converter gas stream enters the process flow through line 20 at the operating pressure of the conversion reactor. When the latter stage of the process is effected in a separate reactor, as in column 2 of the accompanying FIGURE 1, the converter gas is supplied directly to the reactor through line 21 connecting with line 20 and may be introduced into the heated sewage stream at several points along the flow path of the sewage stream through reactor 2. The flow of the aqueous sewage stream is shown to be upflow through reactor 2 in FIGURE 1, concurrent with the flow of converter gas, although downflow of the aqueous phase against a rising, countercurrent stream of the converter gas supplied into the lower portion of the reactor may also be utilized and is generally preferred.

Since the conversion reaction in the case of either oxidation and reduction is exothermic, the stream of aqueous sewage becomes hotter as it flows downstream through the reactor. The rate of conversion also increases with rising temperature and therefore, the consumption of converter gas is more rapid as the stream approaches the downstream outlet of reactor 2. In order to take advantage of the accelerating rate of conversion in the downstream direction, therefore, it may be preferable to provide multiple inlet points for the converter gas stream along the line of sewage flow, the frequency of the inlets being increased as the downstream outlet of the reactor is approached, as shown in FIGURE 1 where the points of gas inlet are increased toward the downstream, upper end of reactor 2. Thus, one or more of points of converter gas injection are provided by line 22 through which the flow rate of converter gas is controlled by valve 23, line 24 containing valve 25, line 26 containing valve 27 and the terminus of line 21 near the upper end of reactor 2 containing valve 28. The flow rate of converter gas supplied to reactor 2 is controlled throughout the length of the reactor 2 to ensure substantially complete conversion of the organic components in the stream of influent sewage before the latter reaches the downstream outlet of the reactor from which it is withdrawn through line 29 at a temperature substantially higher than the sewage stream entering reactor 2 through line 19, being discharged into receiver vessel 30 for intermediate storage prior to recycle into heat exchange column 1.

Receiver vessel 30 also provides a convenient vessel from which the resulting gas phase may be disengaged from the liquid, treated sewage phase. The gas phase which accumulates above the lower aqueous layer in receiver 30 contains the conversion products of the aqueous sewage, such as carbon dioxide, nitrogen, sulfur dioxide, steam, unreacted oxygen, etc., in the process in which the conversion effected in reactor 2 is oxidation. When the conversion is a reduction of the sewage components, the gas phase products include methane, ammonia, hydrogen sulfide and other ultimate reduction products, together with residual gases supplied through the converter gas stream. Since the aqueous phase at this point is a fluid of relatively high temperature, the lower phase does not dissolve an appreciable quantity of the gas phase which may be withdrawn from receiver vessel 30 through line 31 at a rate controlled by valve 34. When the conversion reaction involves reduction and the use of a hydrogen-containing converter gas, generally the hydrogen is incompletely consumed in the conversion and it may be preferable to recycle the residue to the converter gas inlet for more complete use of the hydrogen contained therein. For this purpose a portion of the gas product is withdrawn from line 31 through line 33, recompressed to the required conversion pressure in pump 34 and then recycled to reactor 2 through the converter gas inlet line 20. Fresh converter gas containing a higher concentration of the reactive gas is charged into the process flow from external sources through line 35, which connects with line 20, at a rate controlled by valve 36. In the case of oxidative conversion in reactor 2, the gas supplied to the conversion zone preferably contains at least 10 percent and more preferably, at least 20 percent by weight of oxygen. For reductive conversions in reactor 2, the gas supplied to the conversion zone preferably contains at least 30 percent and more preferably, at least 60 percent by weight of hydrogen. In the event that an appreciable quantity of the more soluble gases, such as sulfur dioxide, or ammonia accumulate in the converted sewage, a separate deaerator (not shown) such as a deaerator of the falling-film type, may be incorporated into the process flow pattern, or the flow rate of converter gas supplied through line 21 may be substantially increased to effect deaeration.

The reaction conditions maintained in reactor vessel 2 or in a similar conversion zone maintained internally in column 1 in a downstream portion of the Heat Delivery Zone, are dependent upon the concentration of organic matter in the sewage influent stream, the temperature of the latter stream as it enters reactor 2, the activity of the catalyst and other factors dependent upon the particular conversion involved in the process, the design of the reactor, and the ability of the reactive gas present in the converter gas stream to enter the liquid phase. The latter feature is substantially enhanced by maintaining reactor 2 at a super-atmospheric pressure, as determined by the pressure of the inlet converter gas stream. However, both the temperature and pressure requirements are interdependent factors and each is generally inversely proportional to the other; furthermore, lower pressures and temperatures are required when a catalyst is present in the reaction zone. Thus, at temperatures of from about 200° to about 300° F., generally utilizable with a catalyst, pressures of from about 50 to about 200 lbs./in.$^2$ are adequate, and in the absence of a catalyst, pressures up to about 2500 lbs./in.$^2$ are required, whereas at temperatures of the aqueous phase in the range of from 300 to 600° F. the pressure variable may be substantially lower to obtain complete oxidation of the organic matter from the sewage stream and generally pressures of from 10 to about 1,000 lbs./in.$^2$ are sufficient. If liquid phase conditions are to be maintained in all stages of the process simultaneously, high pressures are maintained at the same time that high temperatures are utilized. Thus, at 600° F., the maintenance of liquid phase conditions requires the provision of pressures of from at least 1500 to about 1800 lbs./in.$^2$.

For reductive conversion of the sewage in the presence of hydrogen, pressures and temperature conditions are both generally maintained at higher levels in order to ensure destructive hydrogenation of all organic components of the sewage. The operating temperatures and pressures required, however, are also dependent upon the activity of the catalyst; generally, pressures of from 300 to 5000 lbs./in.$^2$ and temperatures of from 300 to 800° F. are generally sufficient.

The particular process conditions required are also dependent upon whether a catalyst is maintained in the conversion reactor and the activity of the catalyst has a further bearing on the temperature and pressure requirements. In order to promote completion of the conversion reaction, while providing greater control of temperatures during the course of fluid flow through the reactor, it is also feasible to vary the concentration of reactive gas in the gas phase present within reactor 2, preferably increasing the concentration of reactive gas in the converter gas at the inlet end of the reactor where the temperature is generally lower. Thus, the oxygen-containing gas stream entering the reactor through line 22 may be enriched with pure oxygen from external sources, whereas the concentration of oxygen in air may be sufficient to complete the oxidation as the stream approaches the downstream outlet of the reactor, for example, by charging the air stream through line 26 and the terminal end of line 21.

In the method of operating the present process in which both the heat exchange and conversion phases of the present sewage treatment process are effected in the same unit of apparatus (that is, in column 1), and the separate conversion reactor is eliminated from the equipment required in the present process, the conversion catalyst may comprise at least a portion of the solid heat exchange medium occupying the one or more bed(s) of solid particles in column 1. The use of column 1 for both the heat exchange and conversion phases of the present process (thus combining column 1 and reactor 2 in the same unit of apparatus) has certain merits over the process flow in which column 1 and reactor 2 are separate units of apparatus, as illustrated. Thus, by introducing the converter gas into the same unit that the raw sewage stream enters for heat exchange purposes, the number of individual units of apparatus involved in the entire process is reduced, and contacting the portion of the bed which has just previously contacted raw sewage with the converter gas reduces, and in some cases eliminates, the solid particles of sewage filtered out of the raw sewage stream by the heat exchange particles in the column. By virtue of such in situ conversion of even the larger particles of sewage, the latter are not retained by the solid heat exchange particles and part of the backwash burden is eliminated. Furthermore, the exothermic heat of reaction is transferred directly to the solid particles of heat exchange medium, reducing heat losses from the process cycle via radiation, incomplete heat transfer, etc. One of the problems, however, arising from such use of mixed liquid (sewage) and gas (converter gas) phase conversion is the problem of pumping the mixed fluids; generally, pumps capable of handling the liquid phase are provided and the gas phase is permitted to flow into the next downstream bed (except the backwash zone) under the pressure head in the upstream bed.

In the unitary type of operation in which both the heat exchange and conversion stages of the process are effected in the same unit of apparatus, the oxygen converter gas stream supplied through line 20 flows through open valve 37 into fluid distribution center 4 which directs the converter gas stream into one or more of said inlet lines of column 1. Thus, the converter gas stream may accompany the raw sewage stream carried into the inlet of bed B4 through line 15, the gas-sewage mixture entering the Heat Delivery Zone of column 1 simultaneously. Alternatively, the raw sewage may be charged into bed B4 through line 15, as aforesaid, while simultaneously, the converter gas stream is charged into the downstream beds of the heat delivery zone of column 1 along the line of fluid flow, for example through line 38 which provides an inlet point of entry for the converter gas into the aqueous raw sewage stream flowing through bed B3. Alternatively or simultaneously, converter gas may also be charged into the Heat Delivery Zone through lines 39 and 40 which separately convey the gas stream into beds B2 and B1, respectively. As in the operation of conversion reactor 2, the gas stream supplied to the portion of the Heat Delivery Zone nearest the downstream outlet of the zone (that is, at the outlet of bed B1) may be of different composition than the gas stream supplied to the portion of the zone nearest the inlet end of said zone. When operated in accordance with the latter alternative process flow in which the conversion of organic contaminants and the absorption of heat from the solid particles in the Heat Delivery Zone of column 1 occur simultaneously, the effluent liquid stream from bed B1 is conveyed through a suitable mixed phase gas-liquid handling pump (not shown) but of standard design, no portion of the effluent of bed B1 being diverted into line 16a, since the high temperature fluid effluent of the heat delivery zone does not have to be separately directed into an external conversion reactor. The portion recycled through line 13 is discharged at a higher pressure provided by pump 14 into the then next adjacent downstream Heat Reception Zone, in accordance with the usual flow pattern. The liquid effluent from the Heat Delivery Zone diverted into the secondary rectification zone as secondary reflux (controlled at a rate of flow less than balanced reflux when the conversion is effected in an external reactor) thus comprises 100 percent of the Heat Delivery Zone liquid effluent when the heat delivery and conversion stages of the process are effected in the same zone of the process flow in which the same portion of the mass of solid heat exchange particles is utilized for both stages.

To recover the heat contained in the hot fluid effluent of the conversion reactor for subsequent transfer to the influent sewage stream, in accordance with the objectives of the present process flow, the hot fluid effluent of the conversion zone is directed into the Heat Reception Zone of column 1 for contact and heat exchange with the solid particles maintained in the latter zone as one or more stationary masses of solid heat exchange particles. In this manner the heat contained in the high temperature fluid is stored in the Heat Reception Zone at the same time that cold sewage enters the downstream Heat Delivery Zone and extracts the heat which was stored in the solid particles during a prior cycle of operation when the Heat Delivery Zone was in a prior phase of the cycle in which it acted as the Heat Reception Zone. The hot converted sewage stream (the effluent of conversion reactor 2 when the heated sewage effluent from the Heat Delivery Zone is withdrawn from column 1 through distribution center 4 and converted in external reactor 2) is directed into line 41 which conveys the hot fluid into the inlet of bed B11, the first bed of the series of B11, B10 and B9 constituting the Heat Reception Zone of the present process flow. When both heat delivery and conversion are accomplished concurrently in the same mass of heat exchange particles, in which case secondary reflux into bed B12 is not required, the secondary rectification zone (bed B12 in the stage of the process illustrated in FIGURE 1) becomes the first bed of the Heat Reception Zone, accepting the entire effluent from the heat delivery-sewage conversion zone. The solid particles of heat exchange material packed into the one or more beds of the Heat Reception Zone are heat exchanged with the hot, influent converted sewage as the latter stream flows in a downstream direction toward bed B9 of the Heat Reception Zone and progressively contacts cooler heat exchange particles last previously contacted with the cooled effluent of the Heat Reception Zone, now withdrawn from bed B9. Because of the large area of heat exchange surface provided by the solid particles in contact with interstitial fluid flowing through each of the beds, around a substantial portion of the exterior surface of the particles, the fluid stream at any given point in the Heat Reception Zone is substantially in thermal equilibrium with the solid particles maintained in said zone with respect to the flow of heat therebetween. Therefore, at the downstream outlet of the Heat Reception Zone (i.e., the outlet of bed B9) the temperature of the fluid leaving bed B9 has been reduced to substantially the temperature of the particles last contacted with cold influent sewage and substantially all of the heat contained in the hot effluent of the sewage conversion stage of the process has been transferred to the solid particles occupying the Heat Reception Zone. However, since the conversion reaction adds additional heat to the fluid stream which has been heated to the elevated intermediate temperature acquired by the stream in the heat delivery zone of column 1 by virtue of the heat extracted from the solid particles in the latter zone, the additional heat added to the sewage via the conversion stage of the process, if excessive, may be withdrawn from the process in the effluent stream of the Heat Reception Zone, in order to prevent the buildup of excessive temperatures in the cycle.

The heat exchanged product of the conversion reaction, in the form of purified water product, is partially withdrawn from the process flow through line 42 which connects with the downcomer between beds B3 and B9 and the remaining portion, herein referred to as primary reflux is allowed to continue its downstream flow into bed B8 which is the first bed of at least one bed in series (bed B8 being the first of two beds in the process illustrated in FIGURE 1) comprising the primary rectification zone.

The primary reflux rate of flow into bed B8 of the current primary rectification zone, is one of the important variables of the present process, being sufficient in quantity to flush the residual interstitial fluid remaining in the void spaces between the solid particles of heat exchange medium by virtue of the fluid deposited in bed B8 during a preceding stage of the operation. Thus, the residual fluid remaining in the void spaces is thereby replaced by purified water comprising the primary reflux which will next be withdrawn from bed B8 after the next succeeding shift in fluid inlets and outlets of column 1. The primary reflux flow rate will be referred to hereinafter more fully in specifying this and other process variables.

The net yield of purified aqueous product, after permitting the primary reflux portion of the effluent from bed B9 to bypass the inlet to line 42, and at substantially the temperature of the inlet sewage stream, or at a somewhat higher temperature if the exothermic conversion stage of the process results in a net increase in temperature, is conveyed through line 42 into fluid distribution center 4 which directs the aqueous product stream partially into an internal channel of the fluid distribution center connecting with an external conduit containing a pump for increasing the fluid pressure for return to column 1 when a backwash flush operation is to be provided in the present process cycle. For this purpose, the portion of the clear water effluent of bed B9 to be utilized as backwash is withdrawn from fluid distribution center 4 through line 43, pump 44 which increase the fluid pressure to a level sufficient to overcome the head in beds B5 and B7, and thereafter into line 45 for return to the fluid distribution center. Internal channels in the fluid distribution center direct the backwash stream into line 46 connecting with the conduit between beds B5 and B6 through which a major proportion of the stream flows in an upstream direction into bed B6. This reverse flow stream dislodges any sewage solids from the particles of heat exchange medium and flushes the solids out of bed B6 into effluent line 47 which directs the backflush effluent stream into fluid distribution center 4. The latter effluent stream, together with primary reflux effluent, is conveyed into settling vessel 3 by means hereinafter described. When bed B12 is to be flushed, the portion of the clear water product diverted for primary reflux effluent, is conveyed into settling vessel 3 by means hereinafter described. When bed B12 is to be flushed, the portion of the clear water product diverted for flushing bed B12 flows into line 16a, through fluid distribution center 4 which directs the flush stream into line 43, through pump 44 and line 45, through distribution 4, into line 41 which connects with the inlet of bed B12. The flush stream, forced by means of pump 44 through bed B12, enters line 13 and together with pump-around fluid from line 13 flows into line 13a. Pump 13b directs the combined streams into the internal channels of the fluid distribution center, into line 53 and backwash settler 3.

Returning to the flow illustrated in FIGURE 1, the net clear water product of the process from bed B9 is directed through the fluid distribution center into line 48 for discharge from the process. Valve 49 in line 48 determines the rate of clear water product withdrawal from the outlet of bed B9 thruogh line 42 and thereby determines the amount of clear water product diverted into the primary rectification zone of which bed B8 is the first of one or more beds in series, as well as the amount diverted into line 43 for back-flushing purposes.

When column 1 is operated in conjunction with conversion reactor 2, the source of high temperature fluid comprising the influent stream into bed B11 of the Heat Reception Zone is the hot conversion reactor effluent stored in receiver vessel 30. This high temperature fluid is conveyed into the Heat Reception Zone of column 1 by withdrawing the lower layer of liquid accumulated in receiver vessel 30 through line 50 and by means of pump 51, the high temperature fluid is conveyed through line 52 into fluid distribution center 4 which directs the hot influent stream into line 41 and bed B11 at the pressure existing in column 1 at the inlet of the Heat Reception Zone.

Most sources of sewage contain at least at significant proportion of inorganic solids which may accompany the organic components for flushing bed B12 flows into line 16a, through fluid distribution center 4 which directs the flush stream into line 43, through pump 44 and line 45, through distribution center 4, into line 41 which connects with the inlet of bed B12. The flush stream, forced by means of pump 44 through bed B12, enters line 13 and together with pump-around fluid from line 13 flows into line 13a. Pump 13b directs the combined streams into the internal channels of the fluid distribution center, into line 53 and backwash settler 3.

Returning to the flow illustrated in FIGURE 1, the net clear water product of the process from bed B9 is directed through the fluid distribution center into line 48 for discharge from the process. Valve 49 in line 48 determines the rate of clear water product withdrawal from the outlet of bed B9 through line 42 and thereby determines the amount of clear water product diverted into the primary rectification zone of which bed B8 is the first of one or more beds in series, as well as the amount diverted into line 43 for back-flushing purposes.

When column 1 is operated in conjunction with conversion reactor 2, the source of high temperature fluid comprising the influent stream into bed B11 of the Heat Reception Zone is the hot conversion reactor effluent stored in receiver vessel 30. This high temperature fluid is conveyed into the Heat Reception Zone of column 1 by withdrawing the lower layer of liquid accumulated in receiver vessel 30 through line 50 and by means of pump 51, the high temperature fluid is conveyed through line 52 into fluid distribution center 4 which directs the hot influent stream into line 41 and bed B11 at the pressure existing in column 1 at the inlet of the Heat Reception Zone.

Most sources of sewage contain at least a significant proportion of inorganic solids which may accompany the organic components making up the sewage and these may exist in the form of solid masses larger than the interstitial spaces between the heat exchange particles occupying the beds of heat exchange column 1. Furthermore, a certain amount of ash is normally formed in the oxidation of most of the organic materials comprising raw sewage, which if not removed from the influent streams supplied to heat exchange column 1 would accumulate on and between the solid particles of heat exchange medium and would ultimately recontaminate the clear water product flowing from the outlet of the Heat Reception zone. In order to free the beds of solid particles of ash residue and particles of solid caught in the interstitial spaces between the heat exchange particles or accumulating on the surface of the solid heat exchange particles, it is desirable to provide a flushing system in the present process flow downstream from the clear water product outlet to thereby remove these individual solids from the one or more beds (generally one bed at a time as the flush zone progresses downstream with each shift of the inlet and outlet points along the line of flow) in a zone of column 1 downstream with respect to the clear water product outlet (i.e., prior to the withdrawal of clear water product from the process). To be of maximum effectiveness as a means of removing sewage solid particles from column 1, the flush stream must flow in a direction opposite to the flow of influent raw sewage, since the sewage solids would have a tendency to adhere to the upstream side of the solid particles of heat exchange medium packed into each of the fixed bed(s) of column 1. Thus, in the process flow illustrated in FIGURE 1 (in which conversion of the organic sewage components is effected in a reactor external to heat exchange column 1), the influent raw sewage stream flows upwardly through the solid particles of packing in column 1 and the underside surface of the solid particles of heat exchange medium in each bed, therefore, has a tendency to collect solid sewage components on the surface of the particles facing the influent stream. The flush stream is accordingly most effective if the charge of flush stream backwashes the solid particles of heat exchange medium, preferably as a surge of water of higher velocity than the upflowing fluid stream. Inasmuch as the residual interstitial fluid remaining in each bed flushed as indicated will become the first fluid to be withdrawn as clear water product when the flushed bed subsequently becomes the last downstream bed of the Heat Reception Zone and the outlet of the bed is the clear water effluent point, it is desirable to leave a residue of clear water in the interstices so that the product subsequently withdrawn from the flushed bed will be of consistent composition and clarity. Accordingly, the source of the flush fluid is that portion of the clear water product diverted from the effluent stream of the heat reception zone (i.e., referring to FIGURE 1 the stream removed from bed B9 through line 42 and diverted into line 43). When utilizing such a flush stream, the volume flow rate of primary reflux into the mass of solid particles next downstream from the heat reception zone (i.e., the primary rectification zone) may be reduced substantially and in some instances, reduced to nil, since the interstitial fluid has already been replaced by flush and no further replacement of interstitial fluid is required.

At the stage of the process illustrated in accompanying FIGURE 1 the flush zone is illustrated as being of one bed (bed B6) downstream from the clear water product outlet, although a number of beds in series (up to and generally not exceeding three in number) may be provided for effecting more complete flushing of the beds downstream from the clear water product outlet, although a number of beds in series (up to and generally not exceeding three in number) may be provided for effecting more complete flushing of the beds downstream from the clear water product outlet, if desired. In the event that flushing is not required, as for example, in a process in which no ash remains upon oxidation of the organic components of the sewage or in a process flow in which the roughage solid in the sewage influent stream have been removed in a pre-filtering operation or in a separation step prior to being charged into heat exchange column 1, no actual backwash flush need be employed and the flow of fluid into bed B6 may be derived in part or entirely from upstream bed B7 as fluid displaced from bed B7 in hydrostatic response to fluid entering upstream bed B8 as primary reflux.

The volumetric flow rate of primary reflux may be varied from 0 to 140 percent of balanced reflux, depending upon the volume of clear water product diverted into the downstream flush zone, but more preferably is maintained at a positive value at all times, from about 10 to about 120 percent of balanced reflux, thereby continuously displacing at least a part of the interstitial fluid in the void spaces between the particles of heat exchange medium. The preferred flow rate will vary depending upon the degree of flushing maintained in the downstream flush zone. Thus, if the flow rate of the flush stream (which is preferably fresh water product) is sufficient to replace interstitial fluid (sewage residue) from each of the beds as they enter the flush zone, the primary reflux rate of flow may be maintained at a relatively low value (e.g., at 10% of balanced reflux), but if the flush stream flow rate does not completely replace the interstitial fluid in the bed undergoing flushing during the period of time that such bed receives the flush stream, the primary reflux flow rate is preferably maintained at from 100 to 140 percent of balanced reflux in order to free the bed of interstitial fluid prior to the withdrawal of fresh water product from the bed. Thus, recontamination of the water product with residual sewage is avoided, particularly when fresh water is the primary product of the process.

The use of the aforementioned flush provides one of the preferred methods of operation under the scope of the process embodied in this invention. A particularly preferred method of charging the flush stream comprises allowing the flush stream charged into the inlet of the first bed upstream from the raw sewage inlet to momentarily and intermittently exceed the steady-state flow rate of the influent raw sewage (at which flow rate the sewage solids were deposited on the particles of heat exchange medium), for example, up to flow rates as high as 350 percent of balanced reflux for periods of time up to 50 percent (preferably for periods of from 10 to 30 percent) of the on-stream time for the particular bed (i.e., during the time lapse between each shift of the inlets and outlets). Under the turbulent flow conditions resulting from the higher flow rate of the flush stream, any particles of grit (ash, sewage roughage, etc.) trapped in the void spaces between the particles of heat exchange medium or retained on the upstream surfaces of the particles of heat exchange medium are dislodged and swept away in the flushing action. Since the particles of sewage dislodged by the flushing action of the primary reflux stream may be recycled in the process, as hereinafter described, no net loss of effluent sewage results and primary rectification is simultaneously effected.

The flush stream flows in an upstream direction (i.e., backwashes) through bed B6 and is withdrawn from the process flow through line 47 which connects with the downcomer between beds B6 and B7. The flush stream effluent of bed B6, carrying with it the raw sewage solids retained on the particles of heat exchange medium in bed B6 joins the fluid effluent of bed B7 flowing in a downstream direction and also enters the downcomer between beds B6 and B7. The latter stream which may be nil, up to about 140 percent of balanced reflux, is the interstitial fluid displaced from bed B7 by virtue of primary reflux entering the inlet of upstream bed B8. Both streams which join at the downcomer between beds B7 and B6 flow into line 47 which connects with fluid distribution center 4, the stream being thereby directed into flush effluent line 53. This stream is then preferably pumped by means of a suitable solids handling pump 54 into line 55 which feeds the backwash stream into solids settling vessel 3. By maintaining the suspension of solids and liquid in vessel 3 in a quiescent state, the solid particles (such as ash, pebbles, etc.) settle out of the liquid phase and accumulate in the bottom of vessel 3. The solids accumulating in the bottom of the settling vessel may be periodically or continuously withdrawn therefrom as grit through line 56 and valve 57 for discharge from the process flow. The supernatant liquid from which the grit has been separated by settling is withdrawn as an overhead stream from vessel 3 through line 58 and recycled to the cold sewage inlet by connection of line 58 with line 5 for further conversion in the process.

As the indicated primary and secondary reflux flow rates the interstitial fluid in the first bed of each of the corresponding primary and secondary rectification zones is substantially replaced by the corresponding reflux fluids before the next shift in inlets and outlets into and from the mass of solid heat exchange particles. In this manner, the streams which will next be withdrawn from the outlets of the bed next adjacent downstream from the current effluent lines (i.e., before rotary valve 4 shifts the inlet and outlet points into and from the mass of solid particles to the next downstream beds, respectively), the fluid in these next adjacent downstream beds will be substantially replaced with fluid of the same composition currently being withdrawn from the process. One of the most important results of maintaining a continuous stream of reflux from both the Heat Delivery Zone and Heat Reception Zone, however, is the continuous shift of the hot and cold zones, respectively in a downstream direction as the points of inlet and outlet are shifted downstream. Since the hot and cold zones advance as a "front" through the mass of solid particles, in advance of the reflux streams, the hot and cold zones are captive zones in the mass of solid particles, advancing through the process flow at the same rate as the movement of inlet and outlet points through the mass of solid particles.

The clear water product withdrawn from the process through line 48 is generally potable, depending upon the degree of back-flushing in the flush zone, or may be readily converted to a potable water product by light chlorination, filtration, ultraviolet treatment or by other well-known means for the treatment of water to eliminate bacteria.

The present method of sewage treatment is also adaptable to complement existing sewage digestion processes utilizing aerobic or anaerobic methods of bacterial digestion. In many instances facilities for sewage disposal by bacterial digestion are already in use and the present heat transfer process may be incorporated into the existing sewage treatment facilities to increase the efficiency and effectiveness of the latter methods. Thus, it is known that bacterial digestion rates are substantially increased if the temperature of the aqueous phase is increased to a maximum of about 120° F. By means of the present heat transfer system the raw sewage influent stream which would normally be supplied directly to the bacterial digestion unit at from about 40 to 70° F. is preheated to 120° F. prior to entry into the digestion tanks. By means of the present adaptation of the sewage digestion process the heat stored in a mass of solid particles of the heat exchange material, extracted by the particles from the treated sewage effluent of a preceding cycle of operation, is transferred to the stream of raw sewage which is thereby heated to 120° F. The resulting heated stream is then charged into the digestion tanks, and after bacterial digestion in the existing, external sewage digestion unit, the treated sewage is reintroduced at 120° F. into the Heat Reception Zone of the heat exchange unit to reheat the solid particles cooled during the prior heat delivery stage of the cycle to the temperature of the raw influent sewage. By this means, the influent raw sewage is heated to the optimum sewage digestion temperature, substantially reducing the residence time of the sewage in the digestion tanks and also reducing the total time required to consummate the sewage digestion. Thus, the capacity of the existing sewage treatment facility would be thereby substantially increased.

A simplified process flow diagram for a heat exchange unit for operation in conjunction with existing sewage digestion facilities is illustrated in accompanying FIGURE 2 which sets forth a process comprising the minimum facilities for such a combination process. Thus, the heat exchange unit 101 is represented as a single, continuous bed comprising a mass of heat exchange particles and made up of a minimum of four essential, functional zones: the Heat Delivery Zone, the secondary rectification zone, the Heat Reception Zone and the primary rectification zone. FIGURE 2 represents the process cycle at a particular point of time in which the Heat Delivery Zone occupies the uppermost portion of the mass of heat exchange particles; the next downstream minimal functional zone occupying the lowermost portion of the column is the secondary rectification zone; the next downstream functional zone is the lower Heat Reception zone; and the farthermost downstream minimal zone relative to the heat reception zone which occupies the upper intermediate portion of the mass of particles is the primary rectification zone, the outlet of which is serially connected immediately or through intervening flush and tertiary rectification zones to the inlet of the Heat Delivery Zone, depicting one cyclic arrangement of zones. It is to be emphasized that although a flush zone and a tertiary rectification zone are illustrated in FIGURE 2 as functional portions of the cycle in the adaptation of the present process illustrated in FIGURE 2, nevertheless, as in the process described in FIGURE 1, the flush zone and tertiary rectification zone may not be required in the process flow and may be eliminated from the process described in FIGURE 2, depending upon the quality of the clear water product desired from the process. Thus, a source of sewage from which no roughage is deposited on the upstream side of the heat exchange particles or having no ash, may not require a simultaneous flushing operation, in which case, the effluent of the primary rectification zone directly enters the next adjacent downstream Heat Delivery Zone. A fluid pump-around conduit 103, connects the outlet of the uppermost portion of the heat exchange column with the inlet at the bottom of the lowermost bed in the column. Pump 102 in conduit 103 maintains the flow of fluids continuously cyclic by increasing the pressure on the fluid entering the lowermost bed to a sufficient head to overcome the pressure drop in the superadjacent beds. Inlets to the Heat Delivery and Heat Reception Zones are provided for the two fluid influent streams and outlets are provided from the downstream outlets of the Heat Delivery and Heat Reception Zones for the two fluid effluent streams, the influent and effluent inlets and outlets alternating along the line of fluid flow. The inlets and outlets are shifted in a downstream direction to the next zone by means of a fluid distribution center 104 shown in FIGURE 2 in simplified form as a flat plate rotary valve. The existing, external sewage digestion facility is figuratively represented by unit 105 and is generally in the form of a large digestion tank of the Dorr Thickener type into the bottom of which air is pumped in the form of fine bubbles to enhance the rate of sewage digestion. The tank may be insulated to conserve heat in the process and prevent an excessive reduction of temperature in this portion of the process flow.

Raw influent sewage at a relatively cold temperature is charged through line 106 into the process flow from the established source at a controlled rate, determined by valve 107, and pumped into fluid distribution center 4 by means of pump 108 through line 109 interconnecting the pump with rotary valve 104. The latter valve is a type similar to the valve utilized in FIGURE 1, hereinabove described, capable of directing the flow of influent and effluent fluids into and from column 101 and shifting the inlet and outlet points for these streams in a downstream direction along the line of fluid flow. The raw sewage enters the process flow through line 110 which conveys the feed into the inlet of the Heat Delivery Zone in which the fluid stream is heat exchanged with the solid particles of heat exchange medium (hereinafter described) packed into column 101, which at the downstream end of the Heat Delivery Zone are at a temperature of approximately 120° F., acquired by the solid particles during a prior stage in the process cycle when the zone currently operating as a Heat Delivery Zone functioned as the Heat Reception Zone. As the cold influent sewage flows through the Heat Delivery Zone it is progressively raised in temperature to 120° F. by heat exchange with the hot particles of solid, simultaneously cooling the solid particles to the raw sewage inlet temperature. The effluent of the Heat Delivery Zone leaving the top of column 101 through line 103, is divided into two portions: (1) a pump-around stream which serves as secondary reflux, and (2) a heated raw sewage effluent which is withdrawn from line 103 through line 111 and transferred to sewage digestion unit 105 through fluid distribution center 104 into line 112 containing pump 112a which feeds the heated raw sewage into sewage digestion unit 105.

At 120° bacterial digestion of the sewage proceeds rapidly, depositing a residue on the bottom of the tank comprising grit and ash which is withdrawn from the tank through line 113 at a rate controlled by valve 114. The digested sewage, now in the form of a clear effluent liquid, and at a relatively elevated temperature is withdrawn from unit 105 through line 115 by means of pump 116. Line 117 conveys the water product into fluid distribution center 104 which directs the flow of water into line 118 and then into the Heat Reception Zone of column 101. The hot, treated sewage (as substantially clear water) flowing downstream through the heat exchange particles packed into column 101 gives up its heat to the solid particles which simultaneously cool the stream to the temperature of the particles as the water reaches the outlet of the Heat Reception Zone.

The effluent stream of the Heat Reception Zone at the lowest temperature extreme existing within the process is divided into two portions: (1) primary reflux which enters the primary rectification zone downstream from the Heat Reception Zone, and (2) a fresh water product which is removed from column 101 through line 119, being thereafter directed by means of fluid distribution center 104 into fresh water product line 120 for withdrawal from the process at a rate controlled by valve 121. The latter valve is on flow control, varying the rate of withdrawing clear water product in proportion to the amount required as primary reflux and for flushing purposes. The flow rate of primary reflux into the next downstream primary rectification zone may be varied from 0 to 140 percent of balanced reflux, being set at a low value if sufficient clear water product is diverted into the downstream flushing zone to replace the interstitial fluid (sewage left in the mass of solid particles when the flush zone was part of the downstream Heat Delivery Zone) with clear water. If the downstream flushing operation (and particularly the amount of water used for flushing) is inadequate to free the solid particles of sewage particles, roughage, etc., higher reflux flow rates are preferred, up to about 140 percent of balanced reflux. Preferably, the rate of primary reflux flow is maintained at somewhat greater than balanced reflux, more preferably from 100% to 120% of balanced reflux to thereby ensure complete replacement of interstitial fluid from the void spaces of the first bed of the primary rectification zone.

The portion of fresh water product withdrawn as the source of flush stream is removed from the fresh water product outlet line 120 through line 122 by means of pump 123 and returned to fluid distribution center 4 through line 124. Internal channels and ports in the fluid distribution center directs the flow of fresh water product reserved for flushing purposes into line 125 connecting the fluid distribution center with the flush zone of column 101. The flush zone is a portion of the mass of solid particles packed into column 101 wherein the flow of the flush stream is reversed relative to the flow of fluid in all other portions of the bed, flowing upstream, through the flush zone which is a small proportion of the total bed of heat exchange particles in column 1 and the boundaries of which shift in a downstream direction as the fluid distribution center shifts all zones through the bed of heat exchange particles in a downstream direction. The flush zone is bounded on the upstream side by the primary rectification zone and on the downstream side by the tertiary rectification zone. The flush effluent and the displaced interstitial fluid from the primary rectification zone combine at the boundary between these zones and flow out of column 101 through line 126 into the fluid distribution center (rotary valve 104) and from valve 104 through line 127 into the raw sewage inlet for recycle in the process. Thus, by introducing the flush stream into the mass of heat exchange particles in column 101 at a point downstream from the outlet of the flush stream, the flush, in effect, acts as a backwash or reverse flow stream in the column, but such backwash flow is particularly effective in freeing large pieces of roughage from the underside of the heat exchange particles which retained the roughage by the sieve action of the mass of particles when raw sewage was introduced into the present flush zone. As hereinabove described for the operation of column 1 (FIGURE 1), the flush stream flow may be a large volumetric flow for short periods of time in order to provide a momentarily high velocity stream which may be more effective in dislodging particles of retained sewage than a low velocity flush stream.

A portion of the flush stream comprising from 100 to about 120 percent of balanced reflux is permitted to flow downstream as tertiary reflux from the flush stream inlet to column 101 into the tertiary rectification zone, thereby displacing interstitial fluid (raw sewage) into the inlet of the Heat Delivery Zone, joining the stream of raw sewage feed stock charged into the mass of heat exchange particles of column 101 at the boundary between the tertiary rectification zone and the Heat Delivery Zone.

As in the operation of the heat exchange column made up of multiple individual beds of heat exchange particles, the fluid inlets and outlets are shifted to more downstream positions when the temperature of the text downstream bed inlet has attained the same temperature as that initially encountered at the beginning of the Heat Delivery Zone.

This invention is further described in the following examples which, however, are not intended to limit the scope of the invention necessarily in accordance with the process flow, feed stocks or process conditions specified therein.

*Example I*

In the following run a sewage treatment process is described which would be of suitable size and capacity to handle the treatment of the raw sewage effluent of a small city in the Southwestern United States having a population of approximately 9500 and having a critical water supply which limits the flow of sewage to approximately 780,000 gallons/day (32,500 gals./hr. or approximately 540 gals. or 72.3 ft.$^3$ per minute). The raw sewage, after removal of large or refractory solid objects, enters the present process flow at the foregoing rate, the raw sewage passing through a series of three hammer mills to reduce solids in the sewage to a finely divided aqueous suspension. The raw sewage charge stream is at a temperature of 70° F.

The present sewage treatment process is a combination of several individual unit operations, including an initial grinding step in which the coarse solids are reduced to fines to produce a fluent liquid which is directed into a heat exchange column by means of a fluid distribution center comprising a pair of flat rotating plates containing grooves and channels in the flat surfaces of the plates, appropriately spaced to direct the influent and effluent streams of the present process to the appropriate beds of the heat exchange column, in accordance with a prearranged program. The influent raw sewage is heated to a conversion level by extracting the heat present in a series of fixed beds of solid particles preheated in a prior stage of the cycle, maintained as the Heat Delivery Zone of the mass of particles. The resulting heated sewage is directed into an oxidation reactor where the sewage stream is heated to a higher temperature by oxidation of the organic components in the sewage. Simultaneous with the above operations, the heated, oxidized sewage is conveyed into another heat exchange zone of the contacting column in which the fluid stream gives up its heat to the cooled heat exchange particles. Also simultaneous with the foregoing operations, a clear water product is withdrawn from the mass of particles in the heat exchange column. By a continuous, stepwise rotation of one of the plates of the valve, each of the inlet and outlet points throughout the series of adjacent equivolumetric beds is gradually shifted an equal aliquot of the total cycle, each cycle being completed every 30 minutes. Thus, as each of the above operations takes place simultaneously and continuously during a period of 2.5 minutes, the rotating plate of the valve gradually shifts each of the influent and effluent points to the next downstream bed, at the same time gradually reducing to nil the flow of fluid into the last previous upstream beds.

The fluid-solid contacting zone or heat exchange apparatus comprises three serially interconnected towers in which the outlet of one tower is connected to the inlet of the next and the outlet of the third is connected to the inlet of the first, each tower being approximately 17 feet in height and 2 feet 3 inches in internal diameter, and each contains four interconnected beds of approximately 4 feet in depth. Each bed contains approximately 16 ft.$^3$ of packing material consisting of hollow cylinders $3/16$ inch diameter by $3/16$ inch in length fabricated from copper-plated steel pipe which provide a surface area (actual, not theoretical, heat exchange surface) of 435 ft.$^2$/ft.$^3$ of packing, or approximately 6960 ft.$^2$ per bed. Of the 16 ft.$^3$ of gross volume in each of the 12 beds in the column, the actual volume of space occupied by fluid (referred to herein as "void space" volume or "interstitial" volume) is approximately 64 percent of the gross volume of each bed, or 10.22 ft.$^3$. Of this volume, empirical determinations indicate that an average of about 78 percent of the interstitial volume moves during the course of the process cycle and 21 percent is relatively stationary. In determining reflux flow rates in which only the actual or effective interstitial volume of fluid is significant for the determination of balanced reflux, as hereinafter specified, the 78 percent of void space volume (10.22 ft.$^3$), or 8.0 ft.$^3$ is taken as the effective interstitial fluid volume. Since each of the beds remain on stream for a period of 2.5 minutes (as hereinafter indicated) the rate of flow herein designated as 100% of "balanced reflux" indicates that the 8.0 ft.$^3$ of interstitial fluid occupying the void space is displaced from each bed in a period of 2.5 minutes, being replaced by fluid originating from the next adjacent upstream bed.

Four of the above beds in series constitute a "Heat Delivery" Zone, from the downstream outlet of which heated sewage, after recovering sufficient heat from the packing material (preheated to approximately 505° F. during the preceding cycle of operation) to raise the temperature of the effluent sewage from the 4th downstream bed to approximately 502° F. is withdrawn from the process flow and diverted into a wet oxidation reaction vessel. A portion (secondary reflux) of the effluent stream from the 4th downstream bed continues to flow in a downstream direction into the 5th downstream bed from the inlet of the raw sewage stream, constituting a secondary rectification zone of the process flow wherein interstitial fluid between the solid particles of packing material in the bed next adjacent to the Heat Delivery Zone is replaced by hot secondary reflux, thereby replacing the interstitial fluid in the 5th downstream bed with heated raw sewage which will be withdrawn therefrom after the next shift in the feed inlets and product outlets, but the replacement of interstitial fluid, however, taking place during the same period that the current bed receiving raw influent sewage continues to be the first bed of the Heat Delivery Zone. The rate of secondary reflux flow is set at 95 percent of balanced reflux which displaces 95 percent of the interstitial fluid in bed No. 5 during the same period that the first bed receives feed stock. At this rate of flow, none of the secondary reflux enters the downstream Heat Reception Zone (starting at the inlet of the 6th downstream bed) where the stream of secondary reflux comprising heated raw sewage would contaminate the desired water product entering this zone of the process flow.

As raw sewage feed stock flows into the first bed of the Heat Delivery Zone, and as a major proportion of the effluent from the Heat Delivery Zone flows into the wet oxidation reactor (hereinafter more fully described) and the secondary reflux portion of the Heat Delivery Zone effluent flows into the 5th downstream bed, the oxidation reactor effluent, at a temperature of 505° F. re-enters the heat exchange column, flowing through the fluid distribution center which directs the oxidation reactor effluent into the inlet of 6th downstream bed from the raw sewage inlet, the first bed of a series of three serially adjacent beds comprising the Heat Reception Zone of the present process flow. The individual beds in the latter zone are also interconnected in fluid-flow relationship to each other and are also packed with the heat exchange particles present in all of the other beds of the column. The Heat Reception Zone serves to store in the solid particles of heat exchange material the heat acquired by the raw, cool inlet sewage stream via heat exchange in the heat delivery zone, in addition to the heat imparted to the sewage as a result of wet oxidation of the organic components of the sewage in the auxiliary wet oxidation reactor.

The hot effluent of the sewage oxidation reactor joins a continuous stream of liquid comprising interstitial fluid displaced from the secondary rectification zone as secondary reflux enters the inlet of the latter upstream zone. The combined stream flows through the 6th, 7th, and 8th downstream beds, displacing interstitial fluid from the void spaces between the particles of solid in these beds. As the stream flows through the beds in series, meeting progressively cooler particles of heat exchange solid toward the outlet of the 8th downstream bed, the heat in the fluid phase is transferred to the solid and the fluid is correspondingly cooled, substantially to the temperature of the solid particles leaving the Heat Delivery Zone (that is, to about 80° F.).

Displaced fluid from the 8th downstream bed (i.e., the outlet of the third and last bed of Heat Reception Zone) is partially withdrawn at 87° F. as the outlet product stream and partially, simultaneously refluxed into the inlet of the next adjacent (9th) downstream bed which is the inlet of the primary rectification zone. The latter portion of the Heat Reception Zone effluent is herein referred to as primary reflux and the next two downstream beds beyond the outlet of the Heat Reception Zone (that is, the 9th and 10th beds relative to the feed stock inlet bed) are referred to as the primary rectification zone. The stream leaving the outlet of the Heat Reception Zone has been almost completely heat exchanged (to 87° F.) with the cold particles of solid (at 80° F.), last previously contacted by the cool flush stream when the bed of particles from which the effluent of the Heat Reception Zone is withdrawn was the inlet bed of the flush zone prior to the last preceding shift of inlets and outlets in the process cycle.

The effluent, cooled aqueous product leaving the heat exchange column through a side-arm pipe connected to the downcomer between the 8th and 9th beds at a temperature of 87° F., is partially diverted as the internal source of the flush stream through the fluid distribution center to a flush pump and thereafter into a line leading to the downcomer between the 11th and 12th downstream beds. The portion of the clear water product (500 gals./min.) which is thus withdrawn from the outlet of the Heat Reception Zone and diverted from the product outlet for use as flush stream is directed through a diversionary channel in the fluid distribution center for a period of only 10 seconds and its diversion as the source of flush stream is then stopped. The remainder of the aqueous product having the properties hereinafter specified is withdrawn through the fluid distribution center into a product receiver.

The wet oxidation reactor which receives the relatively hot (502° F.) effluent of the Heat Delivery Zone is a separate reaction vessel in which oxidation of the dissolved and suspended organic solids present in the raw sewage is effected in the presence of the water comprising the raw sewage stream. Oxidation is effected by bubbling air through the aqueous suspension of raw sewage in the presence of the oxidation catalyst specified below. In order for the oxidation to proceed to completion and yield an aqueous product free of organic contaminants the oxidizing agent must be supplied to the oxidation in excess of that theoretically required to convert the carbon, sulfur and nitrogen present in the compounds comprising the sewage to their gaseous, oxidized state. The partial pressure of oxygen supplied to the zone must be sufficient to transfer the required volume of oxygen into the aqueous phase at a rate sufficient to meet the residence time requirements of the aqueous stream in the reactor. In order to ensure complete oxidation and reduce the size of the reaction vessels required to effect the transfer of oxygen in equipment of reasonable size, a catalyst packing in the oxidation reactor which supplies a large surface area and thereby increases the gas-liquid interface, is provided, the catalyst also increasing the rate of oxidation and conversion to the desired gaseous oxidation products.

The catalyst packing of the oxidation reactor is a mass of solid particles consisting essentially of silver oxide composited with an alumina base, prepared by impregnating pure alumina, precalcined at 1000° F. to form a rigid, refractory support, with an aqueous solution of silver nitrate and thereafter drying, and calcining the resulting composite to form the supported silver oxide. Aluminum oxide gel, precipitated from an aqueous solution of purified aluminum chloride by the addition of hexamethylenetetramine (ammonia-formaldehyde mixture) to the solution, is formed into cylindrical pills of $3/16''$ diameter x $3/16''$ length, calcined at 1800° F. for five hours and thereafter mixed with a 5% aqueous solution of silver nitrate. The pills are allowed to soak in the silver nitrate solution for less than one minute in order to reduce the penetration of the silver nitrate solution into the interior of the particles and thereby concentrate the active catalytic component near the surface of the particles where the gas-liquid interface is present during the wet oxidation reaction.

The impregnated particles of catalyst are dried at 400°

F. for 3 hours and thereafter calcined at 1200° F. for 5 hours in the presence of air. The particles are hard, brittle cylinders which have a shallow layer (200–300 microns in depth) of silver oxide near the surface of the particles, thereby providing a porous shell of catalytic silver oxide surrounding a structurally rigid support of alumina.

The foregoing catalyst particles are evenly distributed in a vertical column of 21 inches internal diameter and 40 feet in height containing 12 equally spaced perforated plates upon which the catalyst particles rest as the fluid streams are charged into the column. The heated stream of raw sewage from the heat exchange zone in the column (i.e., at 502° F.), containing an average of about 300 p.p.m. of organic solids is pumped at pressure of 900 lbs./in.$^2$ and at the discharge rate of the heat exchange zone of 540 gals./min. into the bottom of the wet oxidation column and allowed to flow upwardly through the column in admixture with air introduced into the column at six points along the line of flow. Air at the rate of 606 cubic feet/minute at atmospheric pressure is compressed to 900 lbs./in.$^2$ and charged at the latter pressure into the oxidation reactor through the air intake orifice in the bottom of the column at 3 ft.$^3$/min. as well as into the 5th additional superadjacent orifices spaced to provide air inlets under the 3rd, 4th, 6th, 8th superadjacent plates in the column. The air stream is charged into each oxidation stage supported on the perforated plates through a multi-nozzle distributor pipe which distributes the incoming air stream over the entire undersurface of the perforated plates.

As the air flows upwardly through the co-current sewage stream in contact with the oxidation catalyst, the carbonaceous, nitrogenous and sulfur-bearing organic components of the sewage undergo oxidation, (raising the temperature of the liquid phase from 502° F. (inlet) to 508° F. at the liquid outlet above uppermost plate 1 in the column) and the sewage stream changes from a suspension of finely divided solids to a clear liquid. A gas-liquid phase mixture is withdrawn from the top of the oxidation reactor and collected in a receiver tank in which the gaseous and liquid phases are separated. A waste gas effluent of the receiver is vented to the atmosphere, containing less than 2 percent by volume of oxygen in admixture with small amounts of sulfur dioxide, nitrogen and carbon dioxide as the principal components.

The hot liquid effluent of the wet oxidation reaction, substantially free of suspended fines of organic composition is filtered through a leaf filter and recovered at 506° F. as a clear liquid which is returned to the heat exchange column and charged into the latter column at the inlet of the 6th bed downstream from the raw sewage inlet (as described hereinabove), thereafter flowing through the succeeding three downstream beds, heat exchanging the hot aqueous stream with the packing material in the heat reception zone of the heat exchange column.

As previously indicated the effluent stream from the 8th downstream bed is divided into two portions, one portion referred to as primary reflux continues to flow in a downstream direction into the inlet of the 9th downstream bed at a rate of 120 percent of balanced reflux.

All of the flush stream effluent leaving the upstream outlet of the 11th bed (at the bottom of bed No. 11) is carried out of the process flow through a side-arm pipe connected to the downcomer between the 10th and 11th downstream beds, the effluent thereafter flowing into the fluid distribution center which directs the effluent stream containing suspended solids into a backwash settler from which the supernatant liquid is charged into the raw sewage inlet line for recycle in the process. The flush stream at the above rate dislodges substantially all of the residual solids from the 11th downstream bed during the first few seconds of the 10-second interval that the flush stream is charged into the 11th downstream bed, the effluent joining the displaced interstitial liquid leaving the 10th downstream bed in response to the hydrostatic pressure of the primary reflux stream entering the 9th downstream bed from the upstream outlet of the 8th downsream bed. After 6 to 7 seconds on stream, the flush effluent leaving the bottom of the 11th downstream bed is clear and after 10 seconds, the diversion of aqueous product into the 11th downstream bed for flushing purposes is stopped and all of the product leaves the process flow through the effluent product line. A small flow of the flush stream (about 5 percent of balanced reflux) flows upwardly through the 12th downstream bed, pushing ahead of it the raw sewage left between the particles of solid heat exchange material when the raw sewage influent flowed into the 12th downstream bed during the preceding stage of the process cycle. The remaining raw sewage as interstitial fluid in the void spaces of the first upstream bed is ultimately recovered as recycle effluent when the first upstream bed becomes the flush zone, as described above.

The primary product withdrawn from the outlet of the 8th downstream bed, as aforesaid, comprising the purified aqueous effluent of the process is withdrawn at a temperature of 78° F., at a net average flow rate of 72.1 ft.$^3$/minute. It contains less than 20 p.p.m. of suspended solids of which less than 5 p.p.m. are solids of organic composition.

After remaining on stream for 2.5 minutes the inlet and outlet points currently on stream are shifted $\frac{1}{12}$th of the cycle in a downstream direction (that is, to the inlets and outlets of the next superadjacent downstream beds) by rotation of the movable plate of the central distributing valve which rotates continuously during the period of operation.

*Example II*

In a process flow essentially similar to the flow described in Example I, above, except that the conversion of the organic components of the sewage is effected via hydrogenation, in the presence of a hydrogenation catalyst, rather than the oxidative conversion specified above in Example I, the external reductive hydrogenation reaction is operated at 940 lbs./in.$^2$ and at a temperature of 530° F., utilizing a packing material for the conversion reactor consisting of platinized alumina spheres containing 0.1 percent of platinum, concentrated near the surface of the alumina spheres. The hydrogen is supplied as a mixture of recycle gas containing 48 percent by weight of hydrogen and fresh hydrogen, forming a gas mixture containing methane and 63 percent by weight of hydrogen. The hydrogen is supplied through a series of inlet nozzles distributed along the length of the hydrogenation column, the escaping gas carrying with it a major proportion of the hydrogen sulfide and ammonia formed in the reaction. The aqueous effluent of the conversion reactor is returned directly to the heat exchange column where it is cooled to an effluent temperature of 85° F. in a manner similar to the process described above in Example I. The cooled aqueous product is further freed of its hydrogen sulfide and ammonia by aeration in a separate, packed column through which air is passed countercurrent to a falling film of the aqueous product.

The aqueous product recovered from the effluent of the heat reception zone, after freeing the product of volatile reduction products in the aeration zone contains less than 20 p.p.m. of organic-derived carbonaceous nitrogen-containing or sulfur-bearing compounds. By suitable filtration and aeration, the latter contaminant level can be reduced to less than 2 p.p.m., in a form suitable for use as a potable source of fresh water supply.

As in Example I, the process flow includes a flush operation in which a certain quantity of ash and raw sewage fines deposited on the surface of the packing material in the heat exchanger is flushed by a backwash procedure into a plate-type filter press from which a thick slurry comprising inorganic ash and organic sewage particles is removed from the filter plates by washing the plates into a sump.

We claim as our invention:

1. A continuous process for converting an aqueous feed stock containing organic material to a product consisting essentially of water substantially free of organic material which comprises contacting a relatively cool stream of said aqueous feed stock with a mass of solid particles having heat exchange capacity in the Heat Delivery Zone of a multi-zoned fixed bed of said solid particles, the downstream portion of said zone containing solid particles and interstitial fluid surrounding the solid particles at a relatively higher temperature than said aqueous feed stock, whereby heat is transferred from the solid particles to said feed stock and the temperature of the aqueous stream adjusts substantially to the elevated temperature of the heat exchange particles in the downstream portion of the Heat Delivery Zone as the aqueous stream flows toward the outlet of said zone, continuously transferring at least a portion of the effluent stream from the downstream outlet of the Heat Delivery Zone into the inlet of the next downstream secondary rectification zone, contacting the resulting feed stock with a converter gas comprising one of the group consisting of oxygen and hydrogen at a pressure sufficient to convert the organic material in said feed stock to a volatile conversion product at said elevated temperature, simultaneously forming an intermediate aqueous stream substantially free of organic matter and of higher temperature than the stream entering the conversion reaction, continuously introducing the downstream effluent of secondary rectification zone into the next adjacent downstream Heat Reception Zone wherein heat in the fluid phase is transferred to relatively cool particles of heat exchange solid resident in the downstream portion of said Heat Reception Zone, continuously removing from the downstream outlet of the Heat Reception Zone relatively cool, heat-exchanged aqueous product, simultaneously and continuously charging a primary reflux portion of the cool effluent of the Heat Reception Zone into the next adjacent downstream primary rectification zone, transferring interstitial fluid displaced from the void spaces between the particles of solid heat exchange material in a more remote, downstream portion of the mass of heat exchange particles into the inlet of the farthermost downstream portion of said heat exchange particles, and continuously combining said displaced interstitial fluid with aqueous feed stock entering the next adjacent downstream Heat Delivery Zone, said process being further characterized in that each portion of the mass of heat exchange particles is serially interconnected in fluid flow relationship to the next adjacent portion and all of the fluid inlets and outlets into and from the stationary mass of heat exchange particles are shifted equidistantly in a downstream direction to positions in the mass of heat exchange particles which bear the same spaced relationship to each other after the shift as the positions did before the shift, at a rate whereby the fluid stream at any given point in the continuous, cyclic flow has substantially attained temperature equilibrium with the solid particles of heat exchange material.

2. The process of claim 1 further characterized by charging a flush stream consisting of a portion of said aqueous product removed from the outlet of the Heat Reception Zone into said mass of heat exchange particles relatively upstream with respect to said feed stock inlet and downstream with respect to said primary rectification zone, at a rate of flow sufficient to flush organic material from the particles of heat exchange solid and withdrawing an effluent flush stream comprising an aqueous suspension of organic material through an outlet upstream with respect to the flush stream inlet and downstream with respect to the primary rectification zone.

3. The process of claim 2 further characterized in that the flow rate of said flush stream is from about 0.5 to about 2.5 times balanced reflux.

4. The process of claim 3 further characterized in that the flow rate of said flush stream is increased momentarily to a rate of from 100 to about 250 percent of balanced reflux, for a period not exceeding 50 percent of the total on-stream time for the bed receiving said flush stream.

5. The process of claim 2 further characterized in that said suspension of organic material in flush stream is recycled to the feed stock inlet of the Heat Delivery Zone.

6. The process of claim 1 further characterized in that said primary reflux flow rate is from about 10 to about 140 percent of balanced reflux.

7. The process of claim 1 further characterized in that said heated feed stock effluent of the Heat Delivery Zone is withdrawn from said fixed mass of heat exchange particles and contacted with said converter gas in a separate, external conversion reactor and the resulting conversion product is charged into said Heat Reception Zone at an inlet point which is downstream with respect to the secondary rectification zone.

8. The process of claim 2 further characterized in that a tertiary reflux portion of the flush stream at a flow rate greater than balanced reflux is permitted to bypass the inlet of the flush zone and flow into said fixed mass of heat exchange particles upstream with respect to the inlet of said feed stock.

9. The process of claim 1 further characterized in that said converter gas is oxygen which is contacted with said heated feed stock in an oxidation conversion zone containing solid particles of a catalyst which actively promotes oxidation.

10. The process of claim 9 further characterized in that said catalyst is an oxide of a metallic element selected from the right-hand column of group I of the periodic table.

11. The process of claim 10 further characterized in that said metallic element is silver.

12. The process of claim 9 further characterized in that said oxidation catalyst is supported on an inert refractory material.

13. The process of claim 9 further characterized in that said catalyst is a phthalocyanine salt of an iron group metal of group VIII of the periodic table.

14. The process of claim 1 further characterized in that the conversion of said heated feed stock in the presence of oxygen is effected at a superatmospheric pressure and at a temperature in excess of 200° F.

15. The process of claim 9 further characterized in that said particles of catalyst comprise the solid particles of heat exchange material and said conversion zone is a downstream portion of the Heat Delivery Zone.

16. The process of claim 1 further characterized in that said converter gas is hydrogen which is contacted with said heated feed stock in the presence of a solid catalyst which actively promotes the hydrogenation of organic compounds.

17. The process of claim 16 further characterized in that said catalyst comprises a metal selected from the elements of group VIII of the periodic table.

18. The process of claim 17 further characterized in that said metal is composited with a refractory support.

19. The process of claim 1 further characterized in that each of said zones contains at least one bed of solid heat exchange particles per zone, each bed being interconnected by a fluid conduit between the inlet and outlet of adjacent beds.

20. The process of claim 19 further characterized in that each of said Heat Delivery and Heat Reception Zones contains at least two interconnecting beds per zone.

21. A process for the digestion of sewage at an elevated temperature in the region of 120° F. without substantial consumption of heat which comprises contacting cold, sewage feed stock in the Heat Delivery Zone of a stationary mass of solid heat exchange particles having multiple fluid inlets and fluid outlets along the line of fluid flow, in which Heat Delivery Zone heat is transferred from the particles of heat exchange solid at an elevated temperature in the downstream portion of said Heat Delivery Zone to the cold, influent sewage stream, withdrawing a portion of the heated effluent of said Heat Delivery Zone into an external sewage digestion unit wherein the organic components of the sewage are converted to volatile oxidation products, continuously charging another portion of the heated effluent of said Heat Delivery Zone into the next downstream secondary rectification zone of said mass of heat transfer particles, while simultaneously charging a continuous stream of fluid displaced from the downstream outlet of the secondary rectification zone into the inlet of the next downstream Heat Reception Zone of said stationary mass of solid particles, combining the stream of fluid displaced from the secondary rectification zone with digested sewage at an elevated temperature simultaneously and continuously withdrawn from said sewage digestion unit, simultaneously and continuously withdrawing a cooled portion of the effluent of said Heat Reception Zone from said stationary mass of solid particles, while simultaneously and continuously refluxing another portion of the cooled Heat Reception Zone effluent into the inlet of the next downstream primary rectification zone of said stationary mass of solid particles and at the same time withdrawing a quantity of fluid from the downstream outlet of the primary rectification zone, combining the resulting stream of fluid displaced from the downstream outlet of said primary rectification zone with cold, influent sewage entering the process flow at the downstream inlet to the Heat Delivery Zone, increasing the pressure of the continuously cyclic fluid stream at one point in the cycle and simultaneously shifting all of said inlets and outlets into and from the stationary mass of solid particles in a downstream direction as the fluid at the inlet of each influent stream approaches temperature equilibrium with the solid particles at said inlet.

22. The process of claim 21 further characterized in that another portion of the liquid effluent of said Heat Reception Zone is charged as flush influent into said stationary mass of solid particles at a flush inlet point between the inlet of said Heat Delivery Zone and the outlet of said primary rectification zone and withdrawing at a point upstream from the inlet of said flush stream at least a portion of the flush effluent which carries with it sewage solids retained by the mass of solid heat exchange particles during a preceding stage of the cycle when the flush zone was a part of the Heat Delivery Zone.

23. The process of claim 22 further characterized in that a portion of said flush influent stream enters the next downstream mass of solid heat exchange particles as tertiary reflux and a volume of fluid equal to said tertiary reflux displaced from said downstream mass of particles flows from the outlet of said mass of particles and enters the next downstream Heat Delivery Zone in admixture with said stream of sewage feed stock.

No references cited.